United States Patent
Cherchi

(10) Patent No.: US 7,860,359 B2
(45) Date of Patent: Dec. 28, 2010

(54) OPTICAL BAND SPLITTER/COMBINER AND APPARATUS COMPRISING THE SAME

(75) Inventor: Matteo Cherchi, Milan (IT)

(73) Assignee: PGT Photonics S.p.A., Milan (IT)

( * ) Notice: Subject to any disclaimer, the term of this patent is extended or adjusted under 35 U.S.C. 154(b) by 365 days.

(21) Appl. No.: 11/629,305

(22) PCT Filed: Jun. 21, 2004

(86) PCT No.: PCT/EP2004/006810

§ 371 (c)(1),
(2), (4) Date: Oct. 2, 2008

(87) PCT Pub. No.: WO2005/124412

PCT Pub. Date: Dec. 29, 2005

(65) Prior Publication Data

US 2009/0034968 A1   Feb. 5, 2009

(51) Int. Cl.
*G02B 6/28* (2006.01)
(52) U.S. Cl. .............. 385/24; 385/15; 385/27
(58) Field of Classification Search ............ 385/15, 385/24, 27
See application file for complete search history.

(56) References Cited

U.S. PATENT DOCUMENTS 5,852,505 A   12/1998   Li
7,343,100 B2 *   3/2008   Yao ............................ 398/152
2001/0028765 A1 *   10/2001   Toratani et al. ............... 385/39

FOREIGN PATENT DOCUMENTS

EP   0 724 173 A1   7/1996
JP   5-232333   9/1993
WO   WO 2005/106550 A1   11/2005

OTHER PUBLICATIONS

K. Jinguji et al., "Two-Port Optical Wavelength Circuits Composed of Cascaded Mach-Zehnder Interferometers with Point-Symmetrical Configurations," Journal of Lightwave Technology, vol. 14, No. 10, pp. 2301-2310 (Oct. 1996).
M. Kauffman et al., "Length Minimization in Integrated Optical Circuits Incorporating Directional Couplers and Curved Sections," Journal of Lightwave Technology, vol. 8, No. 10, pp. 1504-1508 (Oct. 1990).
T. Chiba et al., "Waveguide Interleaving Filters," Proceedings of the SPIE, vol. 5246, No. 1, pp. 532-538 (Sep. 8, 2003).
M. Oguma et al., "Four-Channel Flat-Top and Low-Loss Filter for Wide Passband WDM Access Network," Electronics Letters, vol. 37, No. 8, pp. 514-515 (Apr. 12, 2001).

* cited by examiner

*Primary Examiner*—Jennifer Doan
(74) *Attorney, Agent, or Firm*—Finnegan, Henderson, Farabow, Garrett & Dunner LLP

(57) ABSTRACT

An optical device for splitting/combining a first and a second continuous optical wavelength bands, each wider than 10 nm, has a first, a second, a third, a fourth and a fifth optical splitting devices optically coupled in cascade and a first, a second, a third and a fourth optical differential delay devices optically coupled to, and interleaved between, the optical splitting devices. A suitable choice of the coupling angles of the splitting devices and of the differential delays of the optical differential delay devices gives to the structure flattened passbands and stopbands and makes the optical device tolerant to fluctuations of the structural parameters. An apparatus includes the optical device for use in fiber-to-the-premises networks.

13 Claims, 15 Drawing Sheets

OPTICAL BAND SPLITTER/COMBINER AND APPARATUS COMPRISING THE SAME

CROSS REFERENCE TO RELATED APPLICATION

This application is a national phase application based on PCT/EP2004/006810, filed Jun. 21, 2004, the content of which is incorporated herein by reference.

BACKGROUND OF THE INVENTION

1. Field of the Invention

The present invention generally relates to the field of optical wavelength splitters/combiners, more particularly it relates to fiber-to-the-premises network equipments comprising optical wavelength band splitter/combiner.

2. Description of the Related Art

Currently deployed fiber-to-the-premises (FTTP) networks incorporate gigabit passive optical network (GPON) for broadband delivery of voice, video and high-speed data directly to the home or broader community through optical fiber. Converged voice, video and data services networks are also known as "triple play networks". These networks support two signals in downstream direction (from central station to the user) and one signal in upstream direction. A first downstream signal delivers analog television and a second downstream signal delivers digital voice and data services, such as for example telephone and/or Internet. The upstream signal is typically a digital signal delivering voice and data from the user to the central station or the service provider. Typically, FTTP system delivers voice, video and data over a PON using the ITU-T GPON standard. The system supports radio frequency (RF) analog video delivery using a 1550 nm wavelength overlay. High-quality video on a PON is achieved with a high power 1550 nm signal and power requirement at 1550 nm is greatly demanding. The second downstream signal uses a 1490 nm wavelength and the upstream digital signal is typically allocated at 1310 nm wavelength.

In FTTP networks, as well in many other applications, a key technology is signal splitting and/or combining. Signal multi/demultiplexing must fulfill very demanding requirements such as, among the other, wide bandwidths and small cross-talk over a wide temperature range (typically from −40° C. to +85° C.). In fact, low cost components, such as light emitter, are used over a wide temperature range, possibly generating a large wavelength drift. Many applications require a rectangular wavelength response in order to maintain a low-loss and wavelength-independent transmission in a passband and a high-level rejection to all wavelengths in a stopband. For example, anticipated telecommunications applications seek a 1.3/1.55 μm WDM filter having a flat and low-loss passband at 1.280-1.335 μm and a −50 dB stopband at 1.525-1.575 μm.

Various devices have been proposed to fill these new, demanding requirements but none are fully satisfactory.

When the separation of two wide bands widely spaced (centered, for example, around $\lambda_1$=1490 nm and $\lambda_2$=1550 nm) is needed, micro-optic products based on thin-film technology are currently used, such as for example multilayer thin-film filters in free space optics. Nonetheless, they are undesirable because they cannot be readily integrated and because their fabrication requires high labor cost, mainly due to the operations of alignment of components during assembly, and because of difficulties in coupling light to and from fibers.

Optical splitting components may be classified as the following three types: (1) bulk-type optical splitters; (2) fiber-type optical splitters; and (3) guided-wave type optical splitters.

The bulk-type optical splitters are constructed by arranging microlenses, prisms, interference-film filters, etc., and have little wavelength dependence. Although the bulk-type optical splitters can be put into practical use to some extent, they require a long time and skill for assembly and adjustment, and present some problems with regard to long-term reliability, cost and size.

The fiber-type optical splatters are fabricated using optical fibers as constituent material. Although they exhibit reduced wavelength dependence, the fabrication process requires skill, and is not suitable for mass production because of lack of reproducibility.

In contrast, guided-wave type optical splitters have the advantage that they can be constructed on flat substrates in large quantities through processes such as the photolithography process. Hence, they attract attention as a promising type of splitting component which can be reproduced and integrated as compact parts. Optical devices based on this technology are also referred to as planar lightwave circuits (PLC) devices or integrated optical circuit (IOC) devices.

FIG. 1 is a planar view exemplifying a configuration of a conventional (2×2) guided-wave type optical coupler. In FIG. 1, two optical waveguides 2 and 3 are formed on a substrate 1. A part of the optical waveguide 2 and a part of the optical waveguide 3 are brought into close proximity with each other over a length $L_c$ to form a directional coupler 4. One end of the optical waveguide 2 is a first input port 7 into which an optical signal $P_{in}$ is launched, and the other end of the optical waveguide 2 is a bar output port 8 from which a bar optical signal $P_{bar}$ is emitted. Similarly, one end of the optical waveguide 3 is a second input port 5, and the other end of the optical waveguide 3 is a cross output port 6 from which a cross signal $P_{cross}$ is emitted. The directional coupler 4 may be designed in such a way that an optical signal $P_{in}$ launched into the first input port 7 is branched into two optical signals $P_{bar}$ and $P_{cross}$ to be outputted from ports 8 and 6, respectively.

At a given wavelength, the power coupling ratio C is defined as:

$$C = \frac{P_{cross}}{P_{cross} + P_{bar}}, \quad (1)$$

when the input optical radiation is launched only in the first input port 7.

Generally, the power coupling ratio C of an optical coupler of the type of FIG. 1 may be expressed by the following equation:

$$C = \sin^2\theta(\lambda) \quad (2),$$

wherein the coupling angle $\theta(\lambda)$ of the power coupling ratio typically depends on wavelength. In case of a directional coupler 4 of the type of FIG. 1, $\theta(\lambda)$ also depends on the length $L_c$ of the straight coupling region, on the distance between the waveguides at the coupling region over the length $L_c$, on the shape, width and depth of the waveguides, on the refractive index difference between waveguide core and cladding, on the geometry of the input and output curves 9, etc.

For the purpose of the present invention, only positive coupling angles $\theta(\lambda)$ will be considered.

It is in general possible to express the coupling angle of the optical coupler of FIG. 1 as:

$$\theta(\lambda) = \kappa(\lambda)[L_C + \delta L(\lambda)] \quad (3),$$

wherein $\kappa(\lambda)$ is the wavelength-dependent coupling per unit length in the straight part of the coupler and $\delta L(\lambda)$ is an equivalent effective interaction length accounting for the wavelength-dependent coupling contribution of the input and output curves 9.

The optical coupler 4 can act as an optical wavelength splitter, by properly exploiting the wavelength dependence of the power coupling ratio, but its sine-like response does not make it suitable for telecommunication purposes. On the other hand, although the power coupling ratio of the directional coupler 4 can be specified to a desired value at a particular desired wavelength, the wavelength dependence of the coupling ratio presents a problem when the optical coupler is used in a wide wavelength region.

Mach-Zehnder Interferometers (MZI) have been widely employed as optical band splitter/combiner, but they have a sinusoidal response, giving rise to strongly wavelength-dependent transmission and a narrow rejection band.

Other designs have encountered a variety of practical problems.

Article K. Jinguji, N. Takato, Y. Hida, T. Kitoh, and M. Kawachi, "Two-port optical wavelength circuits composed of cascaded Mach-Zehnder interferometers with point-symmetrical configurations," *J. Lightwave Technol.*, vol. 14, pp. 2301-2310, October 1996, discloses in FIG. 12 a frequency multi/demultiplexer having flattened passbands and stopbands. It is created out of single-stage MZI basic circuits by means of two point-symmetry connection procedures and comprises five directional couplers and, interleaved therebetween, four regions for optical differential delay formed by two wavelength arms with a path difference ΔI. The coupling ratios of the couplers are not functions of wavelength. The path difference of the single-stage MZI is determined from the frequency period of the filter characteristics. The spectral transmittance is periodic for optical frequency, since directional couplers exhibit negligible wavelength dependence. The frequency period is set at 10 GHz.

The frequency multi/demultiplexer described in Jinguji et al. is designed for frequency multi/demultiplexing and has very narrow stopband and passband. In particular, as shown in FIG. 12(b) of Jinguji et al., the stopband and passband are narrower than 10 GHz, which means significantly narrower than 1 nm at typical optical transmission wavelengths (from 850 nm to 1800 nm). The Applicant thus observes that the above device is not suitable to split/combine two optical wavelength bands wider than several nm, such as in 1.49/1.55 μm WDM optical transmission system. Moreover, the multi/demultiplexer described therein is not intended for high density optical device, as shown by the relatively low refractive index difference (0.3%). Moreover, Applicant has determined that the structure disclosed in Jinguji et al. exhibits a limited tolerance to fabrication errors, especially in view of a dense optical integration, as will become clear below.

Monolithic optical waveguide devices are particularly promising because they can perform complex circuit functionalities and because they can be made by mass production integrated circuit techniques. The integration of all the components needed for the full functionality in a single optical integrated circuit may reduce the alignment problem. Moreover, a single integrated chip may allow to a larger extent the automation during the module assembly.

SUMMARY OF THE INVENTION

In this context, it is highly desirable to achieve a high-density of optical chips on the substrate wafer, in order to reach an economic cost-effectiveness. In fact, the higher is the density of PLC devices on the substrate, the higher is the saving in the labour-and-material cost and the shorter is the overall processing time. In order to achieve a high-density, it is convenient to choose a high waveguide-to-cladding index contrast, wherein high index contrast means an index contrast equal to or greater than about 1%. A problem arises with high index contrast, in that the fabrication tolerances and chip-to-fiber alignment tolerances worsen with the increasing of index contrast. Nonetheless, cost-effectiveness of the PLC device demands that there is little need of active characterization and/or control of the device, both during the fabrication process and during operation. The active characterization and/or control may be avoided if the device is strongly tolerant to fabrication errors, in order to guarantee high fabrication yield, and if it is strongly tolerant to operation variations, such as wavelength drifting and/or temperature variations. Accordingly, the demand for high density and the demand for high tolerances are in conflict.

The Applicant has tackled the problem of providing an optical band splitter/combiner device, particularly suitable for FTTP networks, having wide flattened continuous bands and strong tolerance to fabrication errors. The Applicant has found that the above problem is particularly severe in the context of PLC devices, and more particularly in the context of high-density PLC devices.

The Applicant has found that a splitter/combiner comprising five cascaded splitting devices and four differential phase delay devices alternated with the splitting devices may be made suitable to the use in wideband WDM transmission systems. In particular, the Applicant has found that a splitter/combiner for a first and a second continuous optical band wider than 10 nm may be made by designing the five splitting devices and the four differential delay devices so as to send the power input at an operating wavelength within a first optical band substantially in one of the two output ports and the power input at an operating wavelength within a second optical band substantially in the other of the two output ports. More particularly, the Applicant has found that a preferred choice of the splitting coefficients of the five splitting devices may result in a splitter/combiner of a first and a second continuous optical band wider than 10 nm having particularly wide flattened bands and very strong tolerance to fabrication errors.

Cascaded configurations of the inventive structure can be designed in order to get even better performances.

The present invention finds particularly advantageous application in the context of integrated optics circuit or PLC devices, particularly silica based PLC, wherein the device may comprise two optical waveguides apt to form the couplers and the differential delays. Moreover, Applicant has found that the present invention is particularly advantageous in the context of high-density circuits, wherein the refractive index contrast is greater than or equal to about 1%, preferably greater than or equal to about 2%. Applicant has found that an optimal choice of the refractive index contrast suitable to meet the above requirements is below about 4.5%, preferably below about 3%.

The present solution shows a good trade-off between high manufacturing automation, high density, high yield and high tolerance.

In a first aspect, the present invention relates to an optical device for splitting/combining a first and a second continuous optical wavelength band, each wider than 10 nm, comprising a first input port and a first and a second output port, a first, a second, a third, a fourth and a fifth optical splitting device optically coupled in cascade and optically connected to the first input port and to the first and second output port, wherein
the first and the fifth optical splitting device have an associated first coupling angle ($\theta_A$),
the second and the fourth optical splitting device have an associated second coupling angle ($\theta_B$) and
the third optical splitting device have an associated third coupling angle ($\theta_C$); and a first, a second, a third and a fourth optical differential delay device optically coupled to, and interleaved between, said optical splitting devices, wherein
the first, second, third and fourth optical differential delay device have a respective differential delay which is substantially an even multiple of $\pi$ at least at a first wavelength ($\lambda_{1op}$) within the first optical band and substantially an odd multiple of $\pi$ at least at a second wavelength ($\lambda_{2op}$) within the second optical band;
the differential delay of the third optical differential delay device is opposite in sign with respect to the differential delay of the second optical differential delay and
the differential delay of the fourth optical differential delay device is opposite in sign with respect to the differential delay of the first optical differential delay, wherein the coupling angles $\theta_A$, $\theta_B$ and $\theta_C$ are selected in order to direct more than half of an output power of a first optical radiation inputting at the first input port and having any wavelength within the first optical band to the first output port and more than half of an output power of a second optical radiation inputting at the first input port and having any wavelength within the second optical band to the second output port.

Preferably, the coupling angles $\theta_A$, $\theta_B$ and $\theta_C$ satisfy, at least at a wavelength $\lambda_{3op}$ within the first optical band, the relation $2\theta_A(\lambda_{3op})+\theta_C(\lambda_{3op})+2\theta_B(\lambda_{3op}) \leq 2\pi$.

More preferably, the coupling angles $\theta_A$, $\theta_B$ and $\theta_C$ satisfy, at least at a wavelength $\lambda_{3op}$ within the first optical band, the relation $$2\theta_A(\lambda_{3op}) + \theta_C(\lambda_{3op}) + 2\theta_B(\lambda_{3op}) \leq \frac{3}{2}\pi.$$

Even more preferably, the coupling angles $\theta_A$, $\theta_B$ and $\theta_C$ satisfy, at least at a wavelength $\lambda_{3op}$ within the first optical band, the relation $2\theta_A(\lambda_{3op})+\theta_C(\lambda_{3op})+2\theta_B(\lambda_{3op}) \leq \pi$.

In a further more preferred configuration, the coupling angles $\theta_A$, $\theta_B$ and $\theta_C$ satisfy, at least at a wavelength $\lambda_{3op}$ within the first optical band, the relation:

$$2\theta_A(\lambda_{3op}) + \theta_C(\lambda_{3op}) + 2\theta_B(\lambda_{3op}) = \frac{\pi}{2}.$$

Advantageously, the first optical differential delay device and the second optical differential delay device may have differential delays equal in sign.

Advantageously, the optical device of the present invention is a planar optical device, for example it may comprise a pair of optical waveguides forming the first, second, third, fourth and fifth optical splitting device and the first, second, third and fourth optical differential delay device. Advantageously, the optical waveguides may have an index contrast higher than about 1% or they may have an index contrast lower than about 4.5%.

In a second aspect, the present invention relates to an optical device for splitting/combining a first and a second optical wavelength band comprising a plurality of optical devices as described above optically connected in tree-cascade.

In a third aspect, the present invention relates to an optical network unit comprising
an optical device for splitting/combining a first and a second optical wavelength band as described above;
a first optical receiver optically connected to the optical device and apt to receive a first signal within one of the first and second optical band; and
a second optical receiver optically connected to the optical device and apt to receive a second signal within the other of said first and second optical band.

Preferably, the optical device for splitting/combining a first and a second optical wavelength band comprises an input port apt to be optically connected to an optical transmission line apt to propagate said first and second signal.

In a further aspect, the present invention relates to an optical network suitable to operate at least at a first and at a second optical transmission wavelength respectively within a first and a second optical wavelength band, the network comprising at least an optical device as described above for splitting/combining said first and second optical wavelength band.

BRIEF DESCRIPTION OF THE DRAWINGS

The features and advantages of the present invention will be made apparent by the following detailed description of some exemplary embodiments thereof, provided merely by way of non-limitative examples, description that will be conducted by making reference to the attached drawings, wherein.

DETAILED DESCRIPTION OF THE INVENTION

Figure 2:
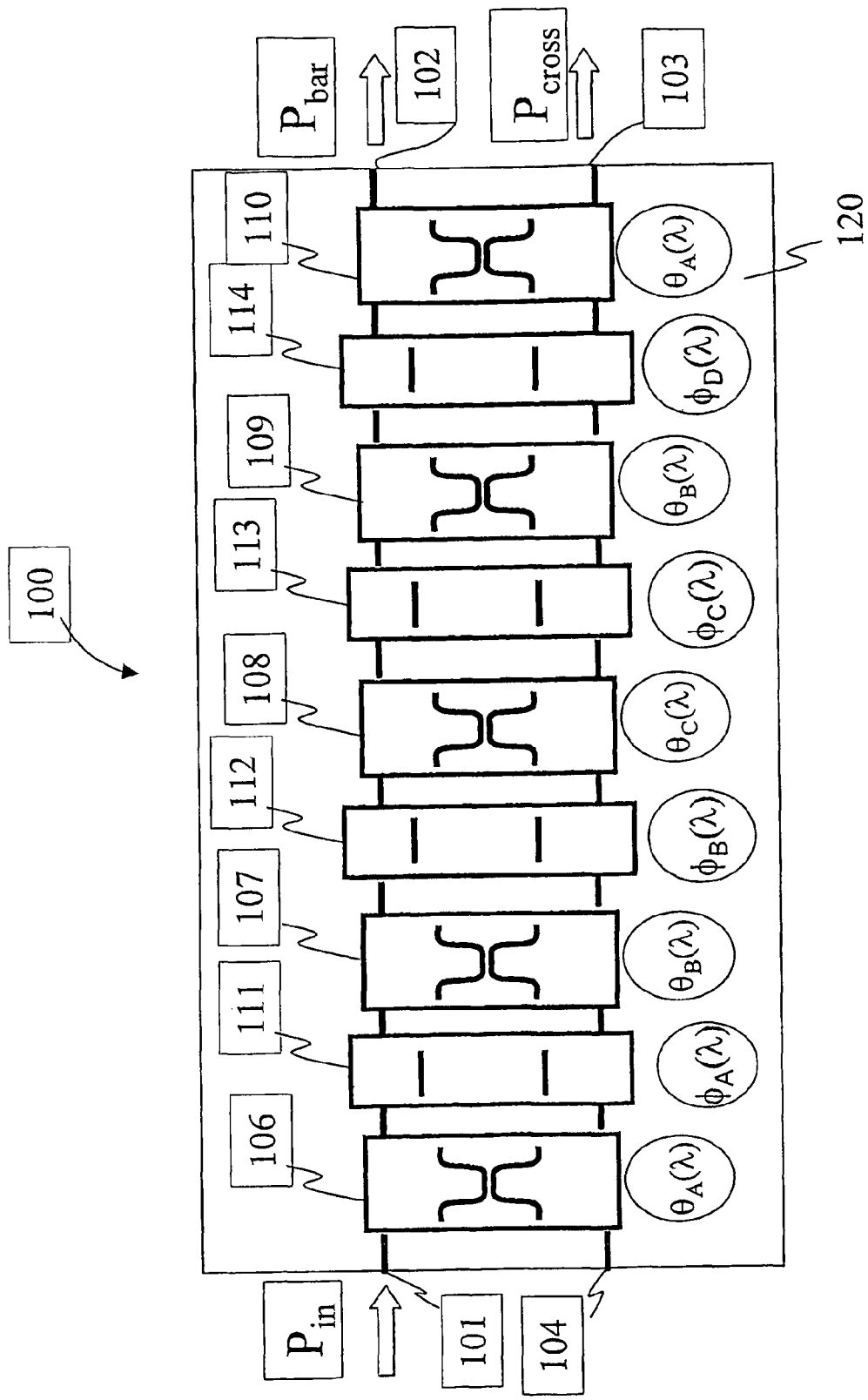
FIG. 2 shows a schematic diagram of an optical device in accordance with the present invention.

FIG. 2 shows a symbolic diagram of an exemplary optical device 100 according to the present invention.

The device 100 comprises a first, a second, a third, a fourth and a fifth optical splitting device, represented respectively by blocks 106, 107, 108, 109 and 110, optically coupled in cascade and a first, a second, a third and a fourth optical differential delay, represented respectively by blocks 111, 112, 113 and 114, optically coupled to, and interleaved between, the optical splitting devices 106, 107, 108, 109 and 110.

The device 100 also comprises at least a first input port 101 and at least a first ("bar") and a second ("cross") output port 102, 103 optically coupled to the first input port 101. The first input port 101 is apt to receive an optical radiation $P_{in}$. The device 100 may also comprise a second optional input port 104.

Optical device 100 of FIG. 2 is apt to split an optical radiation $P_{in}$ inputting the first input port 101 into two output optical radiations $P_{bar}$ and $P_{cross}$ outputting respectively from bar port 102 and cross port 103 and having a respective optical power spectrum. Optical device 100 of FIG. 2 is apt to split/combine a first and a second optical wavelength band. To show this, it is appropriate to consider a large spectrum optical radiation comprising two optical bands as the input optical radiation $P_{in}$ and compare the two output power spectra $P_{bar}$ and $P_{cross}$ normalized at their respective maximum intensity. The power spectrum of the cross output radiation $P_{cross}$ shows at each wavelength of one of the two bands an optical power greater than the optical power at the same wavelength in the power spectrum of the bar output radiation $P_{bar}$. Similarly, the power spectrum of the bar output radiation $P_{bar}$ shows at each wavelength of the other of the two bands an optical power greater than the optical power at the same wavelength in the power spectrum of the cross output radiation $P_{cross}$. In other words, at any wavelength of, e.g., the first optical band, the optical power outputting from one of the output ports is more than half of the total output power outputting from the output ports of the splitter/combiner at the given wavelength.

The wavelengths belonging to the first optical band may be shorter than the wavelengths belonging to the second optical band, or vice versa. For the purpose of the present invention, each of the first and the second optical band is a continuous optical band, i.e. it is not contemplated the case wherein the first and second optical band are spectrally interleaved. Typically it may exists at least one wavelength wherein the two power spectra cross-over. This wavelength is a separation wavelength between the two bands (see e.g. FIG. 8 or 11 or 13).

The first and the second optical band are wide bands, in that each of them has a continuous bandwidth greater than or equal to 10 nm. For example the bandwidth may be greater than or equal to 20 nm, or greater than or equal to 30 nm, or more typically greater than or equal to 40 nm. Preferably, the first and the second optical band contain the wavelengths of 1490 nm and 1550 nm, respectively or in inverse order.

It is advantageous to define a predetermined respective level of cross-talk for each of the first and second optical band to be satisfied by, respectively, a sub-band of the first optical band and a sub-band of the second optical band. Having set a predetermined relative-power level X (dB), which represents a specification on the level of cross-talk for a specific sub-band, the output power spectrum described above outputting from the output port wherein the specific sub-band is suppressed shows, at each wavelength within the specific sub-band, a power level below the predetermined level of cross-talk. Exemplarily, at the bar output port 102 or at the cross output port 103, the power at any wavelength within a sub-band of one of the two bands (called "stopband") should be X dB below the power of any wavelength within a sub-band of the other of the two optical bands (called "passband"). The sub-bands of the first and the second optical band, for a given level of cross-talk X, are typically wide bands, for example setting a level of cross-talk at −12 dB, they may have a bandwidth greater than or equal to 10 nm, more typically greater than or equal to 15 nm, even more typically greater than or equal to 20 nm. Preferably, the first and the second optical sub-band contain the wavelengths of 1490 nm and 1550 nm, respectively or in inverse order.

The input optical radiation $P_{in}$ may be for example an optical signal comprising a first wavelength $\lambda_1$ and a second wavelength $\lambda_2$ comprised into the first and the second optical band, respectively. Typically, the first wavelength $\lambda_1$ and the second wavelength $\lambda_2$ are, also comprised into the respective optical sub-band. The first and the second wavelength $\lambda_1$, $\lambda_2$ are typically widely spaced, for example the spacing between the first and the second wavelength may be greater than about 10 nm, or even greater than about 40 nm.

The optical splitting device 106, 107, 108, 109 or 110 may be any kind of device apt to split an input optical radiation into at least two optical radiations outputting from at least 2 separate output positions of the device. The optical splitting devices 106, 107, 108, 109 or 110 may be for example N×M-port devices, wherein M is at least equal to 2 for all devices and N is at least equal to 2 for devices 107, 108, 109 and 110. For example, the optical splitting device 106, 107, 108, 109 or 110 may be a multi-layer beam splitter or a Fabry-Perot cavity or any mirror (e.g. a Brewster angle window). In a preferred configuration, the optical splitting device may be a MZI splitter/combiner or an optical coupler, such as for example a MMI coupler or a PLC optical coupler. In a more preferred configuration it may be a single 2-port PLC optical coupler of the kind, preferably, of FIG. 1. Optical splitting device 106 may also be, for example, an Y-branch coupler, with one input and two outputs.

Figure 1:
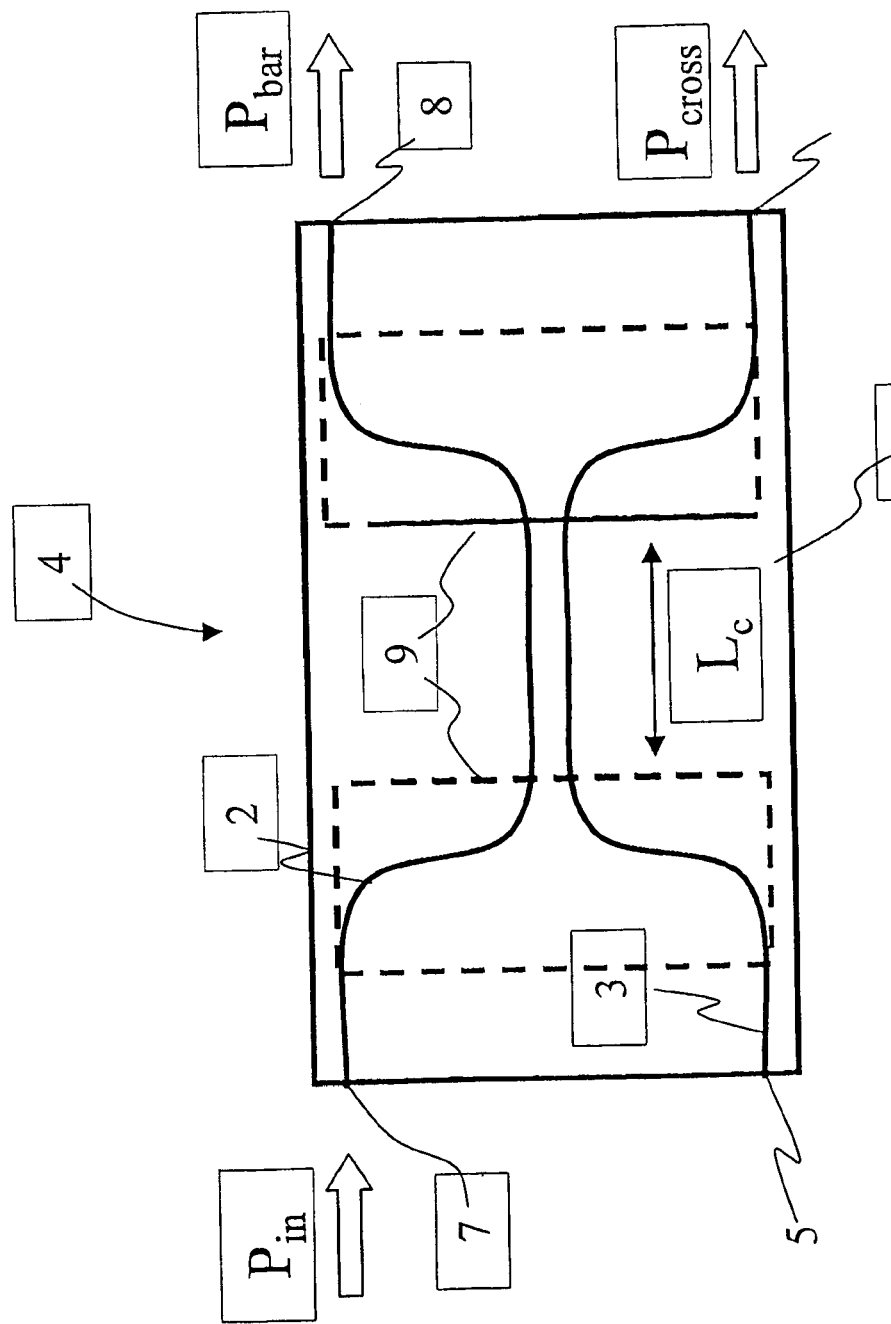
FIG. 1 shows a symbolic diagram of a prior art optical coupler.

Independently from the structure or the number of ports, each of the splitting devices 106, 107, 108, 109 and 110 may be viewed, for the purpose of the present invention, as an optical device comprising, with exemplary reference to FIG. 1, a respective first input port 7, a first (bar) output port 8 and a second (cross) output port 6. In this context, optical splitters 107, 108, 109 and 110 also have a second input port 5. At a given wavelength, the power coupling ratio C of a generic splitter is defined according to equation (1). Generally, the power coupling ratio C of an optical splitter may be expressed by equation (2) as a function of a coupling angle $\theta(\lambda)$.

Optical splitting device 106 has an input port optically connected to the first input port 101 of device 100. Optical splitting device 110 may have a first output port optically connected to the first output port 102 of device 100 and a second output port optically connected to the second output port 103 of device 100.

The first and fifth optical splitting device 106, 110 have substantially the same associated coupling angle equal to about $\theta_A(\lambda)$, as shown in FIG. 2. The second and fourth optical splitting device 107, 109 have substantially the same associated coupling angle equal to about $\theta_B(\lambda)$, as shown in FIG. 2. The third optical splitting device 108 has an associated coupling angle which is equal to about $\theta_C(\lambda)$, as shown in FIG. 2. In a particular embodiment, the third optical splitting device 108 may comprise two distinct optical splitting devices having substantially the same associated coupling angle equal to about $\theta_A(\lambda)$ and optically connected therebetween. In this case, the overall coupling angle $\theta_C(\lambda)$ is substantially equal to about twice $\theta_A(\lambda)$.

In order to take into account the unavoidable deviations due to fabrication errors, as well as those due to the measurement errors, a generic optical splitting device will be regarded, for the purpose of the present invention, as having an associated generic coupling angle $\theta(\lambda)$ if its actual coupling angle does not depart from the coupling angle value $\theta(\lambda)$ by at most 1% of the respective value $\theta(\lambda)$. As an example, the first and fifth optical splitting device 106, 110 will be regarded as having the same associated coupling angle $\theta_A(\lambda)$ even when their actual coupling angles deviate from each other by at most 2%. In this case, the value of the associated coupling angle $\theta_A(\lambda)$ is the average of the two values.

The first, the second, the third and the fourth optical differential delay device 111, 112, 113 and 114 have a respective associated differential delay, $\phi_x(\lambda)$, x=A, B, C, D as shown in FIG. 2. Each of the first, second, third and fourth optical differential delay device 111, 112, 113 and 114 comprises at least a first and a second optical branch disposed in parallel configuration and having different optical-path length, in order to introduce the differential delay $\phi_x(\lambda)$, x=A, B, C, D, between the optical radiations propagating through the two optical branches. Generally, the differential delay changes when changing the wavelength of the optical radiation propagating therethrough. For a generic differential optical path delay, typically the longer the wavelength, the smaller the corresponding absolute value of the differential delay:

$$|\phi(\lambda_1)| > |\phi(\lambda_2)| \text{ if } \lambda_1 < \lambda_2 \tag{4}$$

For the purpose of the present invention, a generic optical differential delay device 111, 112, 113 or 114 may be viewed as an optical device comprising a first input port and a first output port optically connected through the first optical branch and having a second input port and a second output port optically connected through the second optical branch.

In a preferred configuration, the optical differential delay device 111, 112, 113 or 114 may comprise a pair of planar waveguides having different optical paths. The differential delay can be obtained, for example, by adiabatically changing the waveguide shape (e.g. enlarging or narrowing its width) on one arm or by providing an extra length on one arm. By placing the physical modification of the waveguide on the opposite arm, the actual differential delay changes the sign. The differential delay $\phi$ may be given by the relation $\phi = \beta_2 L_2 - \beta_1 L_1$, wherein $L_x$, x=1, 2, is the physical length of the optical path, $\beta_x$, x=1, 2, is the propagation constant of the optical radiation and the suffixes 1 and 2 refers conventionally to the first branch and the second branch, respectively. As a result, a "positive" differential delay will correspond to an optical path of the second branch longer than that of the first branch, while a "negative" differential delay means the opposite.

Conventionally, for the purpose of the present invention, once the first and the second branch of the first optical differential delay device 111 are arbitrarily selected, so as to determine the sign of the respective differential delay $\theta_A(\lambda)$, the first and the second branch of the remaining optical differential delay devices 112, 113 and 114 are consequently determined by the optical connection between said differential delay devices 112, 113 and 114 and the first optical differential delay device 111. More in detail, the optical splitting device 107 has a first input port optically coupled to the first output port of the first differential delay device 111 and a second input port optically coupled to the second output port of the first differential delay device 111. The subsequently cascaded second optical differential delay device 112 has its first input port optically coupled to the first (bar) output port of the preceding splitting device 107 and its second input port optically coupled to the second (cross) output port of the preceding splitting device 107. Hence the first and the second optical branch. of the second optical differential delay device 112 are determined. The subsequently cascaded third optical splitting device 108 has its first input port optically coupled to the first output port of the preceding differential delay device 112 and its second input port optically coupled to the second output port of the preceding differential delay device 112. The subsequently cascaded third optical differential delay device 113 has its first input port optically coupled to the first (bar) output port of the preceding splitting device 108 and its second input port optically coupled to the second (cross) output port of the preceding splitting device 108. The subsequently cascaded fourth optical splitting device 109 has its first input port optically coupled to the first output port of the preceding differential delay device 113 and its second input port optically coupled to the second output port of the preceding differential delay device 113. The subsequently cascaded fourth optical differential delay device 114 has its first input port optically coupled to the first (bar) output port of the preceding splitting device 109 and its second input port optically coupled to the second (cross) output port of the preceding splitting device 109. The subsequently cascaded fifth optical splitting device 110 has its first input port optically coupled to the first output port of the preceding differential delay device 114 and its second input port optically coupled to the second output port of the preceding differential delay device 114.

Advantageously, each of the differential delay devices 111, 112, 113 and 114 is apt to introduce a differential delay which is substantially an even multiple of $\pi$ at least at a first wavelength $\lambda_{1op}$ within the first optical band ($\phi(\lambda_{1op}) = 2n\pi$, n integer) and substantially an odd multiple of $\pi$ at least at a second wavelength $\lambda_{2op}$ within the second optical band ($\phi(\lambda_{2op}) = (2n'+1)\pi$, n' integer).

Exemplarily, in case a differential delay device comprises two optical paths which differ only in the respective lengths, in order to ensure that the differential delays at the two respective wavelengths $\lambda_{1op}$ and $\lambda_{2op}$ differ by an odd multiple of $\pi$, the length difference $\Delta L = |L_2 - L_1|$ should be according to the following expression:

$$\Delta L = (2m+1)\pi / |\beta(\lambda_{2op}) - \beta(\lambda_{1op})|, \text{ m integer} \tag{5}$$

Preferably, m=0 and $\Delta L = \pi / |\beta(\lambda_{2op}) - \beta(\lambda_{1op})|$.

In a preferred configuration, the absolute value of the differential delays of the differential delay devices 111, 112, 113 and 114 are substantially the same ($|\phi_A(\lambda)| \approx |\phi_B(\lambda)| \approx |\phi_C(\lambda)| \approx |\phi_D(\lambda)|$). The third differential delay device 113 may have an associated differential delay $\phi_C(\lambda)$ which is opposite in sign with respect to the differential delay $\phi_B(\lambda)$ of the second differential delay device 112. The fourth differential delay device 114 may have an associated differential delay $\phi_D(\lambda)$ which is opposite in sign with respect to the differential delay $\phi_A(\lambda)$ of the first differential delay device 111. In a particular configuration the first and the third differential delay device 111 and 113 have substantially the same differential delay and the second and the fourth differential delay device 112 and 114 have substantially the same respective differential delay, which is opposite in sign to the differential delay of the first and the third differential delay device 111 and 113 ($\phi_A(\lambda) \approx \phi_C(\lambda) \approx -\phi_B(\lambda) \approx -\phi_D(\lambda)$). In an alternative configuration, the first and the second differential delay devices 111 and 112 have substantially the same differential delay and the third and the fourth differential delay device 113 and 114 have substantially the same respective differential delay, which is opposite in sign to the differential delay of the first and the second differential delay device 111 and 112 ($\phi_A(\lambda) \approx \phi_B(\lambda) \approx -\phi_C(\lambda) \approx -\phi_D(\lambda)$). The Applicant has found that this latter configuration gives better tolerance to fabrication errors with respect to the former configuration in some particular embodiments of the present invention, as will be identified below.

In general, a difference between two optical devices due to the unavoidable fabrication errors does not depart from the optical devices being substantially identical. Accordingly, a deviation of the actual value of a generic differential delay from a respective nominal value $\phi$ by at most 1% does not depart, for the purpose of the present invention, the actual differential delay device from having an associated differential delay equal to about the nominal value $\phi$.

Advantageously, the optical splitting devices have respective associated coupling angles $\theta_A(\lambda)$, $\theta_B(\lambda)$ and $\theta_C(\lambda)$ apt to direct, in combination with above described differential delay devices 111, 112, 113 and 114, more than half of the total output power of an optical radiation inputting at the first input port 101 and having any wavelength within the first optical band to one of the first and second output port 102, 103 and more than half of the total output power of an optical radiation inputting at the first input port 101 and having any wavelength within the second optical band to the other of the first and second output port 102, 103.

Advantageously, the coefficients $\theta_A(\lambda)$, $\theta_B(\lambda)$ and $\theta_C(\lambda)$ must substantially comply with the following relations at least at a third wavelength $\lambda_{3op}$ within the first optical band and at least at a fourth wavelength $\lambda_{4op}$ within the second optical band:

$$\begin{cases} 2\theta_A(\lambda_{4op}) + \theta_C(\lambda_{4op}) - 2\theta_B(\lambda_{4op}) \approx t\frac{\pi}{2} + k\pi \\ 2\theta_A(\lambda_{3op}) + \theta_C(\lambda_{3op}) + 2\theta_B(\lambda_{3op}) \approx (1-t)\frac{\pi}{2} + m\pi, \end{cases} \quad (6)$$

where $t \in \{0,1\}$, k is an integer and m is a non-negative integer. Advantageously, k and m are selected in order to have $\theta_A(\lambda)$, $\theta_B(\lambda)$ and $\theta_C(\lambda)$ positive. Nominally, the first wavelength $\lambda_{1op}$ coincides with the third wavelength $\lambda_{3op}$ and the second wavelength $\lambda_{2op}$ coincides with the fourth wavelength $\lambda_{4op}$, but wavelength deviations may occur because of the fine-tuning of the overall structure. In fact, when designing an optical device in accordance with the present invention, one needs to make the passband and the stopband of each output port of the device to fit with the desired optical bands. In addition, the designer needs to take into account the specific desired level of cross-talk of each stopband, which in general may vary with the first and the second optical band. As a consequence, a fine tuning process is usually required to achieve the desired specifications and it is generally driven by the optical sub-band having the most stringent specification for the cross-talk. Exemplarily, one may start from an ideal condition wherein $\lambda_{1op}$ is equal to $\lambda_{3op}$ and is at the center of the desired optical sub-band and $\lambda_{2op}$ is equal to $\lambda_{4op}$ and is at the center of the respective desired optical sub-band. After calculating, e.g. by computer simulation, the corresponding spectral response, one may seek an optimal configuration by stepwise changing, for example, $\lambda_{1op}$ and $\lambda_{3op}$ independently from each other. Typically, $\lambda_{2op}$ and $\lambda_{4op}$ move accordingly. The process ends when an optimal solution is found.

It is noted here that, strictly speaking, the combination of the optical splitting devices and differential delay devices of the present invention does not direct an optical radiation inputting at the first input port 101 and having a specific wavelength within the first optical band totally at one of the first and second output port 102, 103 and an optical radiation inputting at the first input port 101 and having a specific wavelength within the second optical band totally in the other of the first and second output port 102, 103. This is because of the deviation of $\lambda_{1op}$ from $\lambda_{3op}$ and $\lambda_{2op}$ from $\lambda_{4op}$ at the end of the fine tuning process described above. Nevertheless, the optical device 100 of the present invention is apt to direct an optical radiation inputting at the first input port 101 and having a wavelength within the first optical band substantially at one of the first and second output port 102, 103 and an optical radiation inputting at the first input port 101 and having a wavelength within the second optical band substantially in the other of the first and second output port 102, 103, wherein "substantially" means at least the 95% of the total power outputting from the device 100 at the respective wavelength.

It is appreciated that in eq. (6) it is taken into account the wavelength dependence of the splitting devices in the optical bands of interest.

Aiming to optimize the optical device 100 with respect to tolerance to fabrication errors, the Applicant has found that it is advantageous to choose the indexes t, m and k in order to keep the coupling angle values $\theta_A(\lambda)$, $\theta_B(\lambda)$ and $\theta_C(\lambda)$ as low as possible. This in turn means that, according to relation (3), also the lengths of the splitting devices 106, 107, 108, 109 and 110 are as low as possible, thus reducing the wavelength dependence of the coupling angle itself. In addition, in view of a high density optical circuitry, it is advantageous to minimize the physical length of the constituent parts of the optical device. The reduced wavelength dependence of the splitting devices is particularly critical in high index contrast technology.

In particular, the Applicant has found that t, m and k should advantageously satisfy the following selection rules:

$$\begin{cases} m \geq |k| & \text{for } t = 0 \\ m \geq k + 1 & \text{for } t = 1 \text{ AND } k \geq 0 \\ m \geq -k & \text{for } t = 1 \text{ AND } k < 0. \end{cases} \quad (7)$$

Table 1 shows some of the possible configurations corresponding to the lower-order choices of indexes t, m and k in accordance to (7):

TABLE 1

| t | m | k | $2\theta_A + \theta_C + 2\theta_B$ |
|---|---|---|---|
| 0 | 0 | 0 | $\pi/2$ |
| 1 | 1 | 0 | $\pi$ |

TABLE 1-continued

| t | m | k | $2\theta_A + \theta_C + 2\theta_B$ |
|---|---|---|---|
| 1 | 1 | −1 | $\pi$ |
| 0 | 1 | 1 | $3\pi/2$ |
| 0 | 1 | 0 | $3\pi/2$ |
| 0 | 1 | −1 | $3\pi/2$ |
| 1 | 2 | 1 | $2\pi$ |
| 1 | 2 | 0 | $2\pi$ |
| 1 | 2 | −1 | $2\pi$ |
| 1 | 2 | −2 | $2\pi$ |
| 0 | 2 | −1 | $5\pi/2$ |

The last column of table 1 shows the respective sum of all the coupling angles of the band splitter/combiner 100 at the third wavelength $\lambda_{3op}$ within the first optical band, according to the second relation of eq. (6). The sum is a good indication of the total length of the optical splitters 106, 107, 108, 109 and 110 in the particular case of PLC optical splitters, such as for example of the type of FIG. 1. The last column is advantageously sorted in ascending order. The last column is particularly useful when optimizing the splitter/combiner 100, in that it shows how a choice of t, m and k corresponding to a given value of $2\theta_A+\theta_C+2\theta_B$ is preferred over a choice of t, m and k corresponding to a higher value of $2\theta_A+\theta_C+2\theta_B$. In fact, a PLC splitter/combiner comprising longer optical couplers will occupy more space on the substrate of fabrication, thus reducing the yield of the manufacturing process. Moreover, longer optical couplers will generally lead to narrower rejection bands and to higher sensitivity of the overall spectral response of the respective splitter/combiner with respect to small fluctuations of the structural parameters arising from the manufacturing process, as will be described in greater details below. This is especially true in the context of high index contrast PLC splitters/combiners, wherein the tolerance of the optical devices to manufacturing errors worsen with the increasing of the refractive index contrast.

Applicant has found that it is preferable to choose the parameters t, m, k according to the first ten rows of table 1, which corresponds to a choice, in addition to rules (7), of m smaller than or equal to INT[(3+t)/2], wherein INT is the integer part of the argument. In other words, the coupling angles $\theta_A$, $\theta_B$ and $\theta_C$ satisfy the relation $2\theta_A(\lambda_{3op})+\theta_C(\lambda_{3op})+2\theta_B(\lambda_{3op}) \leq 2\pi$ at least at a third wavelength $\lambda_{3op}$ within the first optical band. More preferably, in addition to rules (7), m should be advantageously chosen smaller than or equal to INT[(2+t)/2], corresponding to the first six rows of table 1, even more preferably m should be smaller than or equal to INT[(1+t)/2], corresponding to the first three rows of table 1. In other words, the coupling angles $\theta_A$, $\theta_B$ and $\theta_C$ more preferably satisfy the relation $2\theta_A(\lambda_{3op})+\theta_C(\lambda_{3op})+2\theta_B(\lambda_{3op}) \leq 3/2\pi$, even more preferably they satisfy the relation $2\theta_A(\lambda_{3op})+\theta_C(\lambda_{3op})+2\theta_B(\lambda_{3op}) \leq \pi$, at least at a third wavelength $\lambda_{3op}$ within the first optical band. Applicant has found that the preferred lowest order choice corresponds to the first raw of Table 1, wherein the choice (t,m,k)=(0,0,0) represents the smallest overall sum of the coupling angles $2\theta_A+\theta_C+2\theta_B=\pi/2$, at least at a wavelength within the first optical band, five time smaller than the sum of the coupling angles of, for example, the case (t,m,k)=(0,2,−1).

The Applicant observes that the example disclosed in the above cited article of Jinguji et al. (see page 2308, $2^{nd}$ column, the angles $\theta_1$, $\theta_2$ and $\theta_3$ corresponding to angles $\theta_A$, $\theta_B$ and $\theta_C$ of table 1) shows a choice of (t,m,k)=(0,2,−1), which correspond to a sum $2\theta_A+\theta_C+2\theta_B$ greater than $2\pi$ within the first optical band.

The Applicant has also found that an optical device 100 corresponding to the choice (t,m,k)=(0,0,0) and having the first and the second differential delay devices 111 and 112 having differential delays equal in sign ($\phi_A(\lambda) \approx \phi_B(\lambda) \approx -\phi_C(\lambda) \approx -\phi_D(\lambda)$) exhibits a better tolerance to fabrication errors with respect to the configuration wherein the first and the second differential delay devices 111 and 112 have differential delays opposite in sign ($\phi_A(\lambda) \approx -\phi_B(\lambda)$).

Optical device 100 may advantageously be on a substrate 120, such as for example a silicon or oxide substrate. In a more preferred configuration, optical device 100 is a PLC optical device, more preferably a PLC optical device comprising a pair of optical waveguides, even more preferably a high density PLC optical device. Advantageously, the refractive index contrast of the waveguides is greater than about 1%, preferably greater than, or equal to, about 2%. Advantageously, the refractive index contrast of the waveguides is lower than or equal to about 4.5%, preferably lower than or equal to about 3%.

In use, an optical radiation $P_{in}$ having first and second wavelength $\lambda_1$ and $\lambda_2$ respectively within a first and a second optical band is fed to the optical device 100 of FIG. 2 at the input port 101. The optical device 100 of the present invention splits the optical radiation into two optical radiations $P_{bar}$ and $P_{cross}$ outputting respectively from first output port 102 and second output port 103. More particularly, at the bar port 102 the output signal $P_{bar}$ comprises most of the optical power at one of the first and second wavelength $\lambda_1$ and $\lambda_2$. Similarly, at the cross port 103 the output signal $P_{cross}$ comprises most of the optical power at the other of the first and second wavelength $\lambda_1$ and $\lambda_2$. In case one of the first and the second wavelength $\lambda_1$ and $\lambda_2$ lies within the respective optical sub-band having a predetermined level of cross-talk, the output signal at the respective output port comprises an optical power at the considered wavelength below the specified cross-talk level. Exemplarily, the cross talk level may be −13 dB for the sub-band, 1490±10 nm and −16 db for the sub-band 1550±10 nm.

Figure 3:
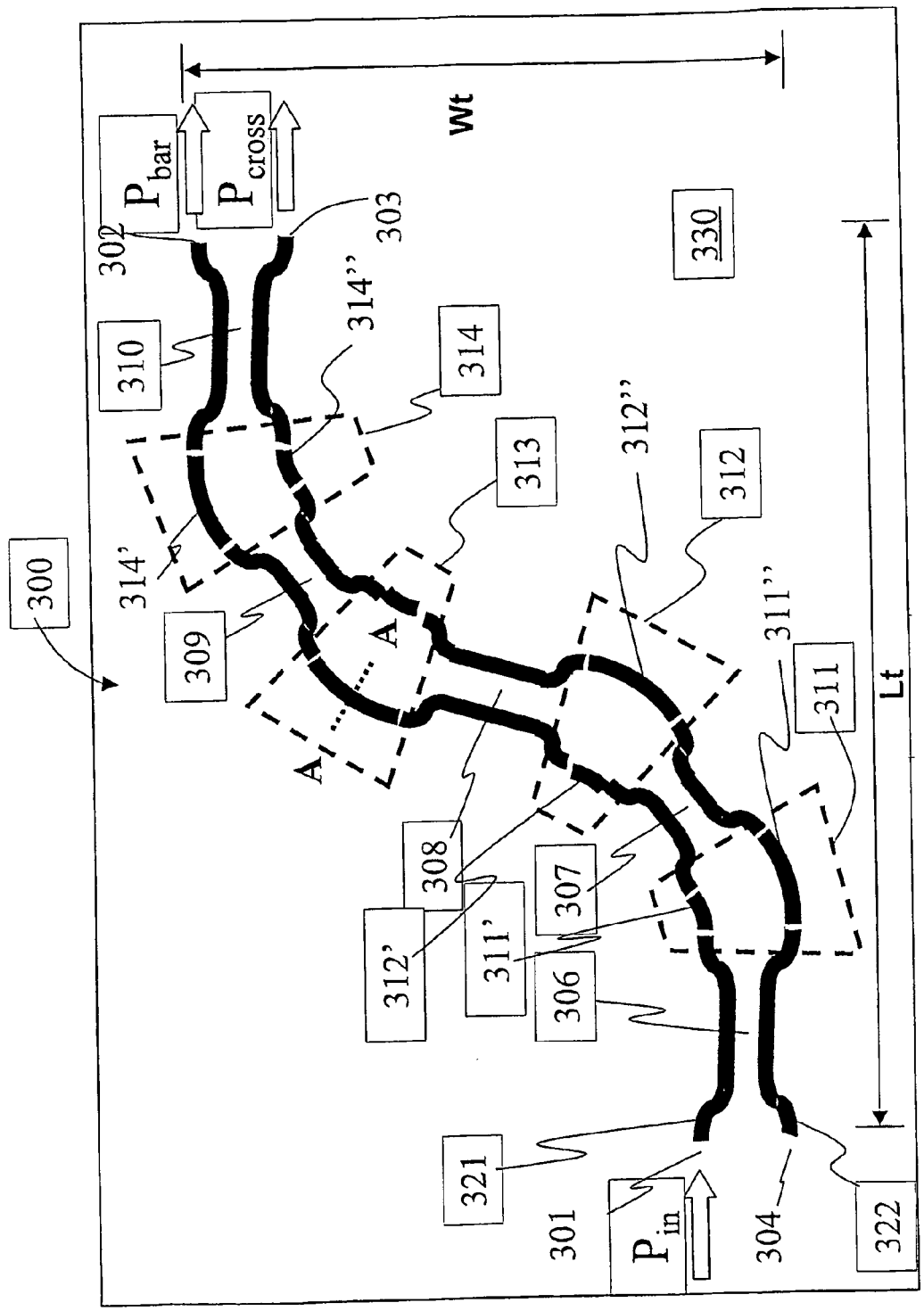
FIG. 3 shows a schematic diagram of a first exemplary embodiment of the present invention.

FIG. 3 is a schematic planar view of an exemplary PLC optical device 300 in accordance with a first preferred embodiment of the optical device 100 of the present invention. The optical device 300 is a 2-port optical band splitter/combiner for splitting/combining a first and a second optical band comprising, exemplarily, the wavelengths of 1550 nm and 1490 nm, respectively. Exemplarily, the first and second optical band are set equal to about 1550±25 nm and about 1490±25 nm, respectively. Exemplarily, respective sub-bands of first and second optical band are set equal to 1550±10 nm and 1490±10 nm, respectively. A specific level of cross-talk may be predefined for each sub-band. Exemplarily, the cross talk level may be −13 dB for the sub-band 1490±10 nm and −16 db for the sub-band 1550±10 nm.

Optical device 300 comprises two substantially identical planar optical waveguides 321, 322 which are advantageously put in close proximity at five different locations in order to obtain five optical couplers 306, 307, 308, 309 and 310. Four optical differential delay devices 311, 312, 313 and 314 are interleaved between the coupling regions 306, 307, 308, 309 and 310. The two optical-path lengths of each of the optical waveguides 321 and 322 in a region between two successive directional couplers 306, 307, 308, 309 or 310 are made different from each other in order to build optical differential delay devices 311, 312, 313 and 314. In particular, the first optical differential delay device 311 comprises a first and a second optical arm 311' and 311", arbitrarily selected on the waveguides 321 and 322, respectively. The second optical arm 311" is longer than the first optical arm 311' and hence, according to the convention introduced above, the associated differential delay $\phi_A$ is positive in sign.

The sign of the differential delays associated to the remaining optical differential delay devices 312, 313 and 314 is determined by the connection therebetween, as described in greater details above. Specifically, the respective optical arm of the optical differential delay devices 312, 313 and 314 laying on the first optical waveguide 321 is regarded as the respective first optical arm and the respective optical arm of the optical differential delay devices 312, 313 and 314 laying on the second optical waveguide 322 is regarded as the respective second optical arm. For example, the lower arm 312" of the second optical differential delay device 312 in FIG. 3 is regarded as the respective second arm, being optically connected to the second output port of the optical splitter 307, which in turn is the cross output port of the optical splitter 307 connected to the second arm 311" of the first differential delay 311. In the embodiment of FIG. 3, the first optical differential delay device 311 has an associated differential delay $\phi_A$ which is positive in sign, the second optical differential delay device 312 has an associated differential delay $\phi_B$ which is positive in sign and the third and fourth optical differential delay devices 313 and 314 have a respective associated differential delay $\phi_C$ and $\phi_D$ which is negative in sign.

In FIG. 3, optical waveguides 321 and 322 may be realized on a flat substrate 330. The overall length Lt of device 300 may be for example equal to about 5300 μm and the overall width Wt may be for example equal to about 2000 μm. One end of the optical waveguide 321 is a first input port 301, apt to receive an optical signal $P_{in}$, and the other end of the optical waveguide 321 is a bar-output port 302 apt to emit a bar optical signal $P_{bar}$. Similarly, one end of the optical waveguide 322 is a second input port 304, and the other end of the optical waveguide 322 is a cross-output port 303 apt to emit a cross optical signal $P_{cross}$.

Exemplarily, the two waveguides 321, 322 may be buried, ridge or rib waveguides on a substrate material or they may be photonic crystal waveguides on a substrate material. Advantageously, the core to cladding structure of the two waveguides 321, 322 may be made of a combination of materials such as $SiO_2$, $Ge:SiO_2$, BPSG, GBSG, SiON, $Si_3N_4$, Si, SiGe, $Al_xGa_{1-x}As$, $In_xGa_{1-x}AsP$, $Cd_xZn_{1-x}Te$, GaN or the like or polymeric materials such as polyimides, acrylates, polycarbonates, silicones, benzocyclobutene (BCB), epoxy resins or the like.

Figure 4:
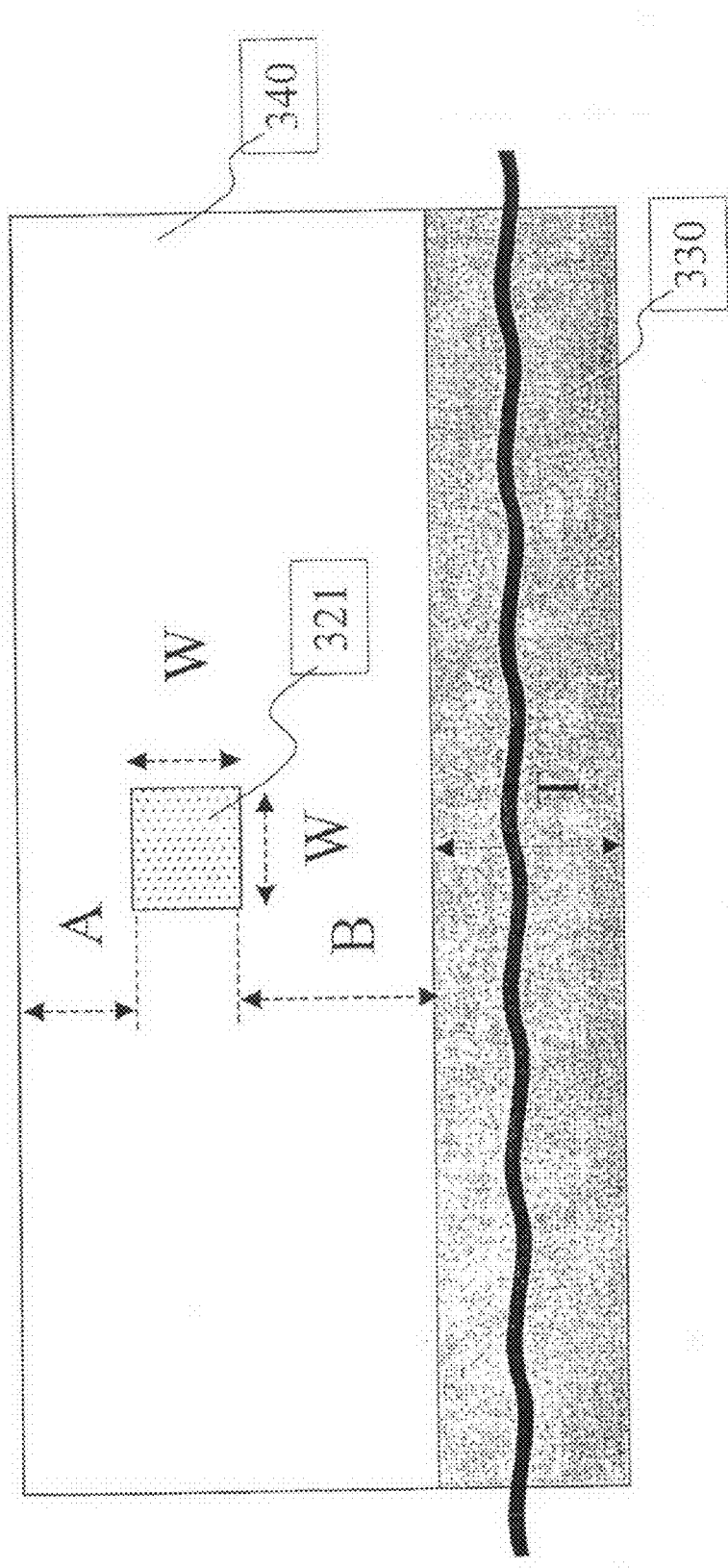
FIG. 4 shows a cross-sectional view of the device of FIG. 3 taken along line A-A.

FIG. 4 is a schematic cross-sectional view of an exemplary configuration of waveguide 321 taken along the line A-A in FIG. 3, wherein the same reference numerals are used where appropriate. The planar optical waveguide 321 is exemplarily an optical waveguide buried into a silica ($SiO_2$) layer 340 on a silicon substrate 330, such as for example a silicon wafer having a thickness T of 600 μm (FIG. 4 may not be to scale).

The waveguide core-to-cladding index contrast is advantageously chosen equal to about 2.5% at 1550 nm, and it is obtained with a convenient doping of Boron and Phosphorus. Applicant has found that this index contrast is an optimal choice in order to guarantee bending radii of the order of 1.5 mm. An advantage of this solution may be the possibility to achieve smaller devices, i.e. a higher density on a wafer. The index contrast is therefore preferably higher than commonly used 0.7% index contrast, more preferably higher than about 1%, even more preferably higher than about 2%. On the other hand high wafer density doesn't necessarily mean higher yields, because smaller features and higher index contrast, in general, worsen both fabrication and coupling tolerances.

Even thought higher index contrast are feasible, preferably the index contrast is kept below about 4.5%, more preferably below about 3%.

Waveguide 321 has preferably a square core having W×W cross-sectional side of, for example, 2.6 μm×2.6 μm, in order to satisfy the requirement of monomodality in the lower end of the low-wavelength band (e.g. at 1490 nm−10 nm=1480 nm) for the chosen index contrast. Quotes A and B in FIG. 4 are exemplarily 5 μm and 10 μm, respectively.

Figure 5:
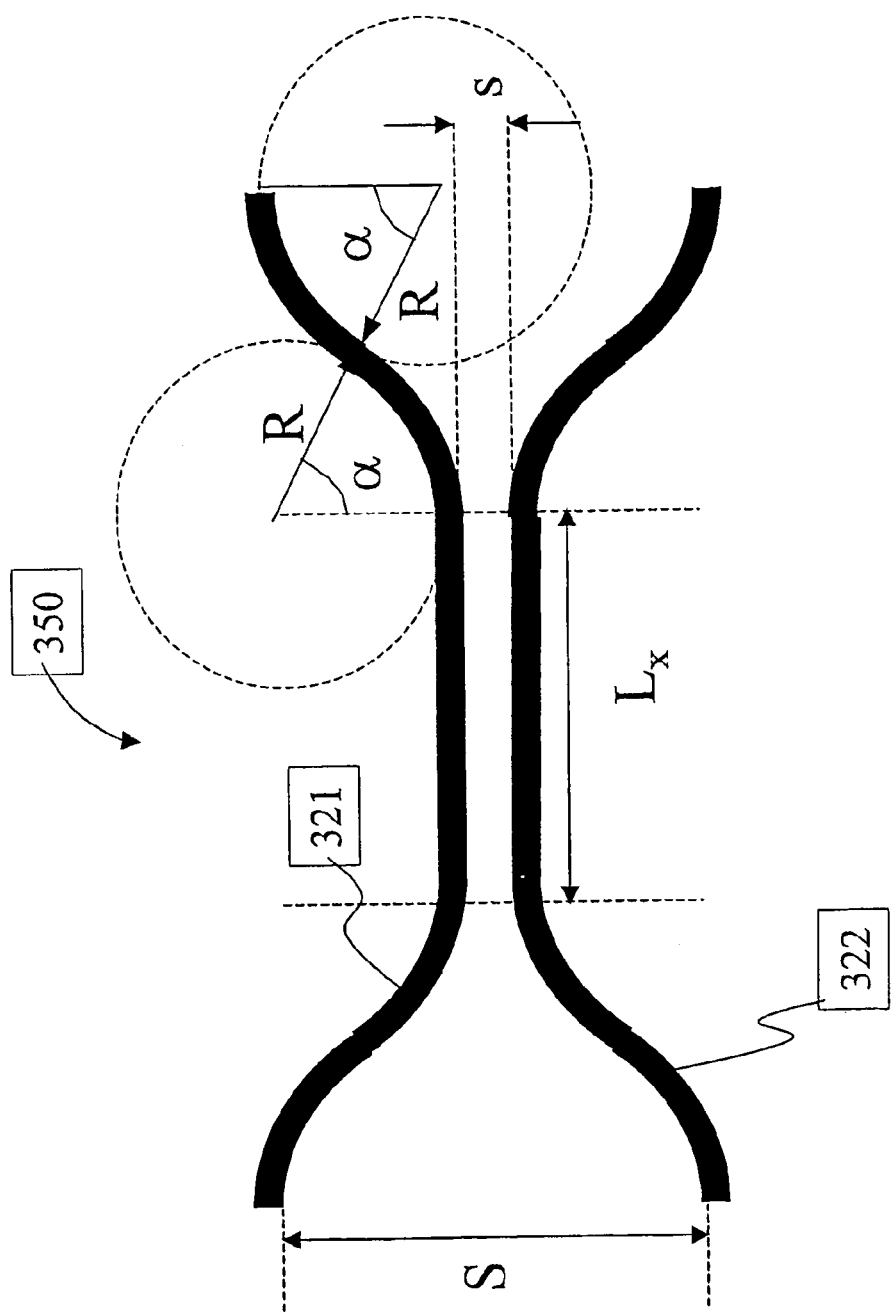
FIG. 5 shows a schematic diagram of an exemplary design of an optical splitter comprised in the optical device of the present invention.

FIG. 5 shows a schematic (not to scale) diagram of a generic exemplary optical coupler 350 similar to the optical coupler of FIG. 1. Optical couplers 306, 307, 308, 309 and 310 are preferably based on the same design scheme of the optical coupler 350 of FIG. 5, provided however that the proper length $L_x$ is chosen for the respective straight coupling length.

In a possible embodiment of optical device 300, the first and the fifth optical coupler 306 and 310 are advantageously substantially identical and have advantageously the same coupling lengths $L_A$. The second and the fourth optical coupler 307 and 309 are advantageously substantially identical and have advantageously the same coupling lengths $L_B$. The third optical coupler 308 is advantageously a single optical coupler having an associated coupling length $L_C$. The straight coupling lengths $L_x$, x=A, B and C, the waveguide separations S and s, the radius R and angle α of the input and output curves are selected in order to direct, in combination with the optical differential delay devices 311, 312, 313 and 314 described below, more than half of the output power of a first optical radiation inputting at the first input port (301) and having any wavelength within the first optical band to one of the first and second output ports (302, 303) and more than half of the output power of a second optical radiation inputting at the first input port (301) and having any wavelength within the second optical band to the other of said first and second output ports (302, 303).

In the above exemplary case of first and second optical band equal respectively to about 1550±25 nm and about 1490±25 nm and of refractive index difference equal to about 2.5% and W×W of about 2.6×2.6 μm, a possible set of values for the above parameters is the following: S=32.1 μm, s=2.6 μm, R=2000 μm, α=4.7° and the coupling lengths $L_x$, x=A, B and C, are set equal to 17.4 μm, 83.4 μm and 34.8 μm, respectively. Correspondingly, the first condition $2\theta_A(\lambda_{4op})+\theta_C(\lambda_{4op})−2\theta_B(\lambda_{4op})=0$ of eq. (6) is verified at $\lambda_{4op}$=1490 nm which is within the second optical band and the second condition $2\theta_A(\lambda_{3op})+\theta_C(\lambda_{3op})+2\theta_B(\lambda_{3op})=\pi/2$ of eq. (6) is verified at $\lambda_{3op}$=1538 nm which is within the first optical band. This corresponds to a choice of t, m and k of 0,0,0. It is noted that the length of the third coupler 308 has been advantageously chosen substantially twice the length of the first and fifth coupler 306 and 310, in order to make the passband and stopband fit with the desired bands. In this particular case, the first optical band (about 1550±25 nm) is directed mostly at the cross output port 303.

Figure 6:
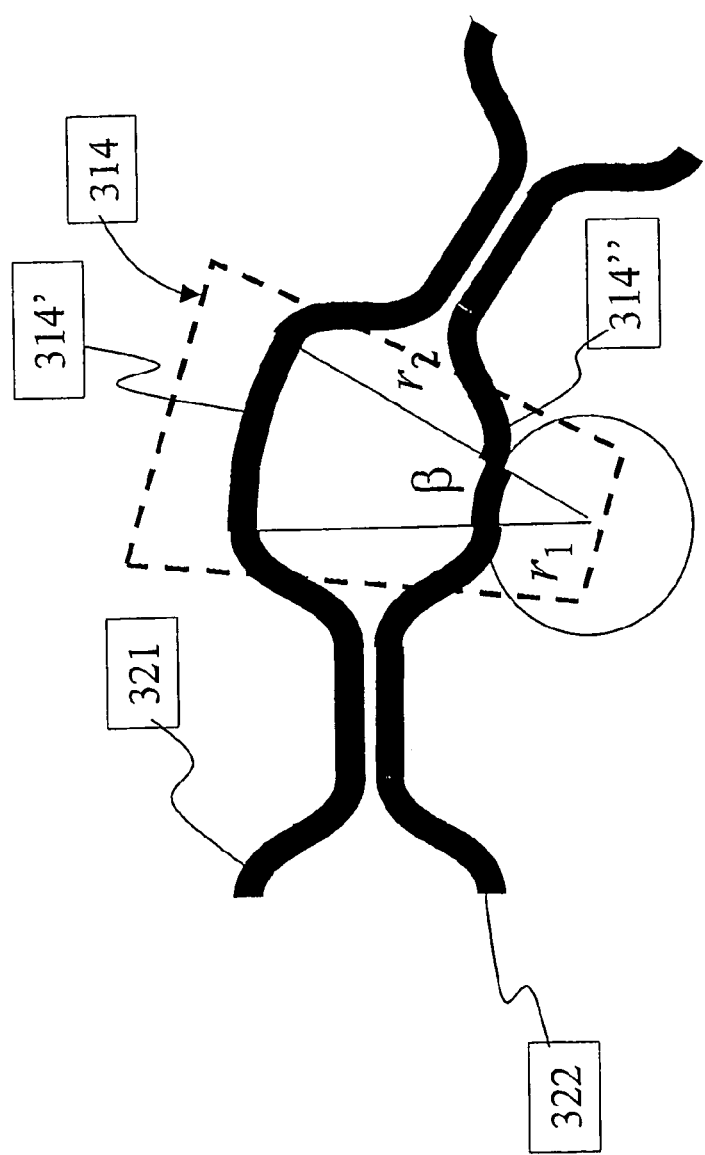
FIG. 6 shows a schematic diagram of an exemplary design of an optical differential delay device comprised in the optical device of the present invention.

FIG. 6 shows a schematic (not to scale) diagram of an exemplary design of any of the optical differential delay devices 311, 312, 313 or 314. Optical differential delay device 314 is exemplarily shown in FIG. 6. Any of the optical differential delay devices 311, 312, 313 or 314 is preferably based on the same design scheme of FIG. 6, provided however that the respective longer optical-path lays on the proper optical waveguide 321 or 322, in order to achieve the proper sign of the respective differential delay.

Optical differential delay device 314 of FIG. 6 is obtained by way of shaping the two optical waveguides 321 and 322 in the form of two arcs having the same angle β and different radii $r_1$ and $r_2$ in order to provide the first arm 314' with an extra length ΔL with respect to the second arm 314". The angle β and the radii $r_1$ and $r_2$ are conveniently selected in order to achieve a differential delay which is substantially an even multiple of π at a first wavelength ($\lambda_{1op}$) within the first optical band and substantially an odd multiple of π at a second wavelength ($\lambda_{2op}$) within the second optical band. Exemplarily, the angle β and the radii $r_1$ and $r_2$ (measured with respect to the waveguide axis) are 22.71°, 1500 μm and 1532.1 μm, respectively. Accordingly, the difference ΔL between the lengths of the second and the first arm 314", 314' is set equal to about 12.73 μm in order to achieve a differential delay, in absolute value, of about 24π at a wavelength $\lambda_{1op}$ equal to 1547.5 nm and of about 25π at a wavelength $\lambda_{2op}$ equal to 1488 nm.

These values of the differential delays have been exemplarily selected by way of a fine-tuning process similar to the one described above aimed to center the exemplary filter on the sub-bands of interest. The simulations were performed with convenient small changes of the differential delays and of the coupling lengths. Table 2 summarizes the most relevant parameter's values previously indicated for the illustrative embodiment according to FIG. 3:

TABLE 2

(t, m, k) = (0, 0, 0)
β = 22.71°, $r_1$ = 1500 μm, $r_2$ = 1532.1 μm, ΔL = 12.73 m
$\phi_A > 0, \phi_B > 0, \phi_C < 0, \phi_D < 0$,
$|\phi_X(\lambda_{1op})| \approx 24\pi, \lambda_{1op}$ = 1547.5 nm
$|\phi_X(\lambda_{2op})| \approx 25\pi, \lambda_{2op}$ = 1488 nm
X = A, B, C, D
$L_A$ = 17.4 μm, $L_B$ = 83.4 μm, $L_C$ = 2 × $L_A$ = 34.8 μm
$2\theta_A(\lambda_{3op}) + \theta_C(\lambda_{3op}) + 2\theta_B(\lambda_{3op}) = \pi/2, \lambda_{3op}$ = 1538 nm
$2\theta_A(\lambda_{4op}) + \theta_C(\lambda_{4op}) - 2\theta_B(\lambda_{4op}) = 0, \lambda_{4op}$ = 1490 nm Cascading two or more optical splitters according to the present invention further improves the spectral response; for example it further improves the stopband cross-talk.

Figure 7:
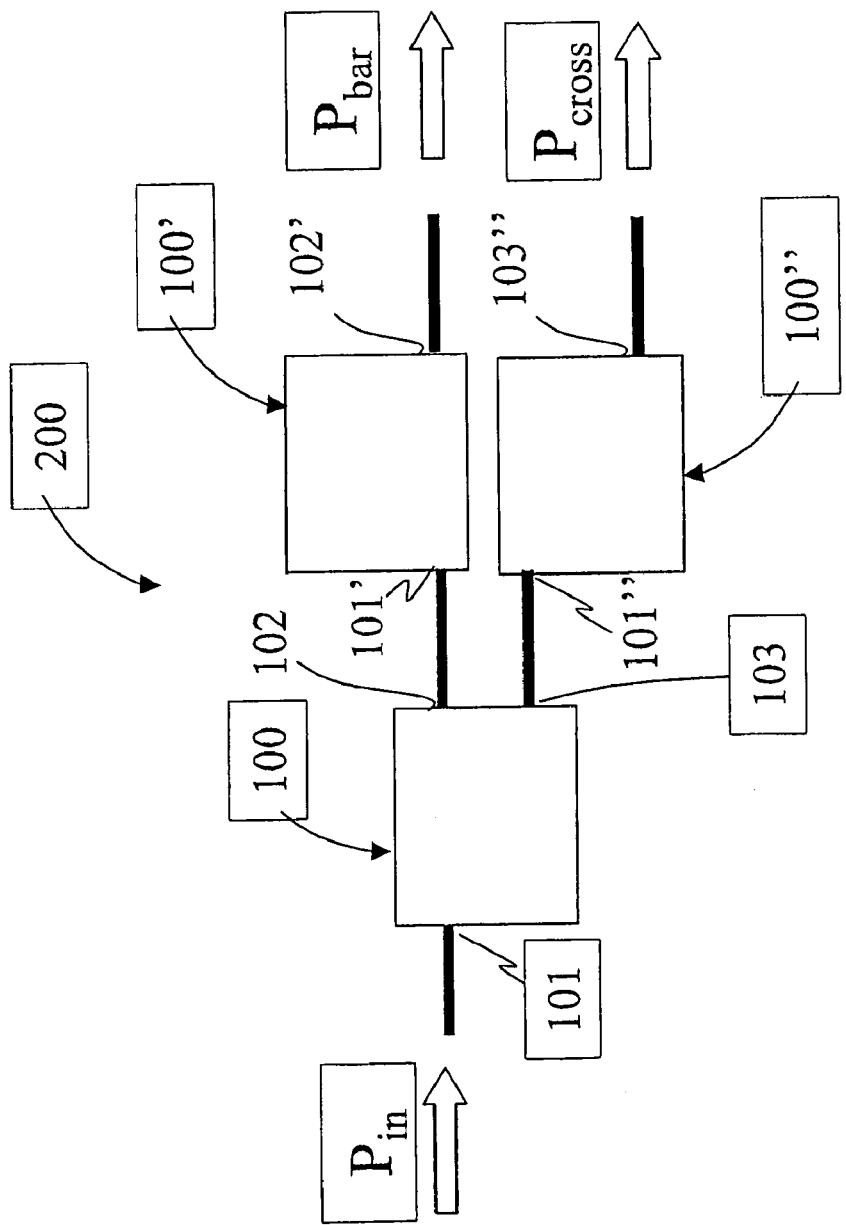
FIG. 7 shows a schematic diagram of an optical device comprising a combination of optical devices as in FIG. 2 or 3.

FIG. 7 shows a schematic diagram of an exemplary device 200 comprising a tree-cascade of optical devices 100 in accordance with the present invention. A first device 100 is tree-cascaded with a second and a third device 100' and 100", all devices being in accordance with the present invention. Advantageously, the second device 100' has its first input port 101' connected to the output bar port 102 of the first device 100. The third device 100" has its first input port 101" connected to the cross port 103 of the first device 100.

An optical signal $P_{in}$ fed to the first device 100 at its first input port 101 is split into two optical signals outputting from the bar and cross output port 102 and 103, respectively. The signal outputting from bar port 102 is fed to the device 100' and is further split into two optical signals outputting from the two output ports of device 100'. The signal of interest is the signal $P_{bar}$ outputting from the bar port 102' of device 100', which shows a pass-band comprised within one of the first and second optical band and a doubly suppressed stopband comprised within the other of the first and second optical band. Similarly, the signal outputting from cross port 103 is fed to the device 100" and is further split into two optical signals outputting from the two output ports of device 100". The signal of interest is the signal $P_{cross}$ outputting from the cross port 103" of device 100', which shows a pass-band comprised within one of the first and second optical band and a doubly suppressed stopband comprised within the other of the first and second optical band. In this way it is possible to achieve a spectral response of the composite device 200 which is typically the sum of two spectral responses of the single device 100, when both are expressed in logarithmic scale and normalized to the maximum intensity. This is done in order to improve the suppression of the sub-band to be stopped, i.e. to reduce the cross-talk.

Figure 8:
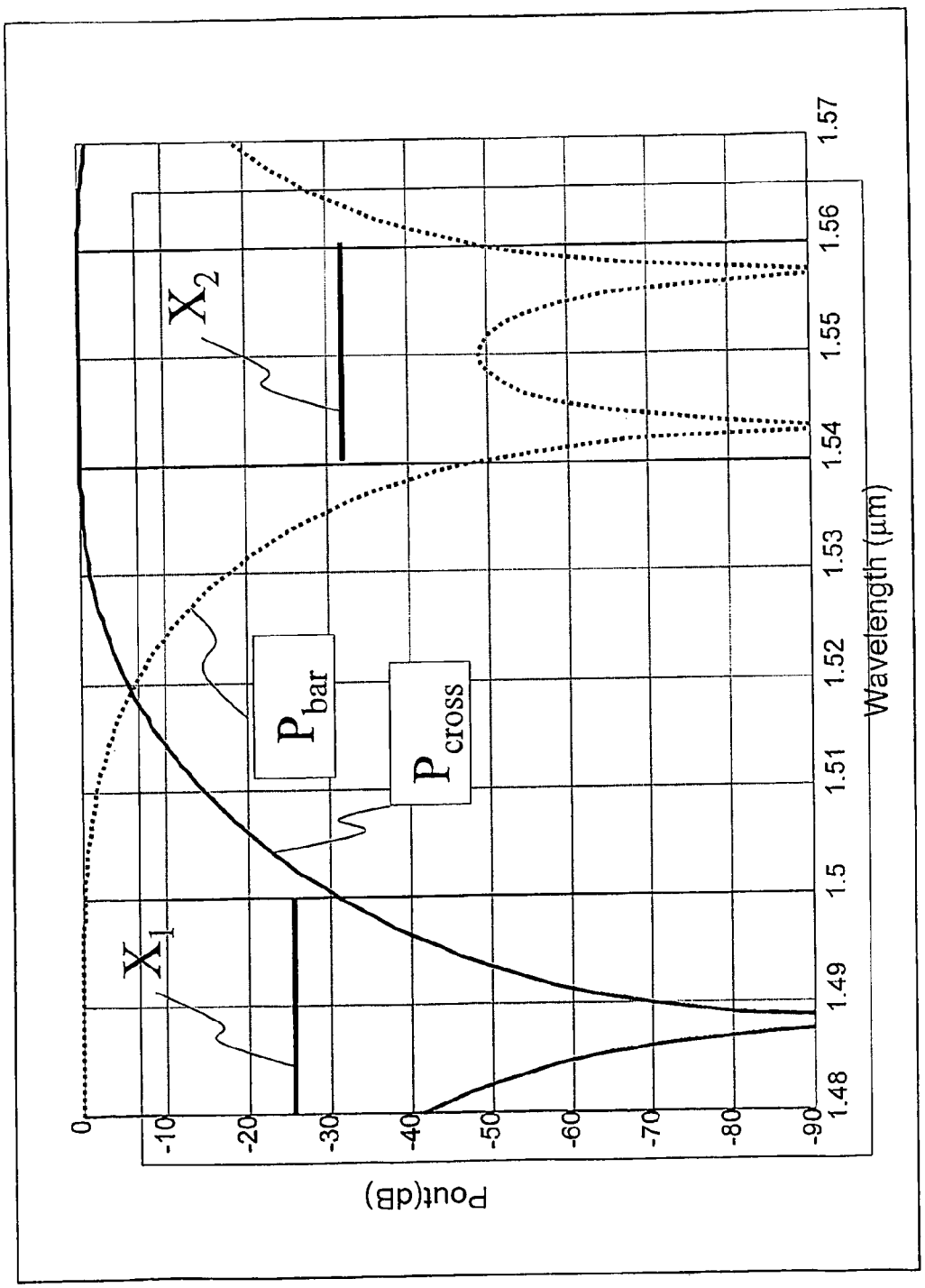
FIG. 8 shows simulation results of a spectral response of the first embodiment of the present invention.

FIG. 8 shows a simulation result of the normalized spectral response of the exemplary optical device of FIG. 7, wherein all the three optical devices 100, 100' and 100" are designed according to the embodiment 300 of FIG. 3 and table 2. In FIG. 8, the curve denoted $P_{bar}$ represents the normalized spectral power outputting from bar output port 102', and the curve denoted $P_{cross}$ represents the normalized spectral power outputting from cross output port 103", when a large spectrum optical radiation $P_{in}$ is launched into input port 101 of FIG. 7. FIG. 8 shows that the present embodiment of the optical device 200 of FIG. 7 complies with the specification of a −26 dB cross-talk (represented by curve $X_1$) for the cross output port 103", wherein the output pass-band of interest is the sub-band from about 1540 nm to about 1560 nm. Specifically, any wavelength within the sub-band from about 1480 nm to about 1500 nm in the cross output port 103" is suppressed at a power level at least 26 dB below the optical power at any wavelength in the sub-band from about 1540 nm to about 1560 nm. Also, FIG. 8 shows that the optical device 200 of FIG. 7 complies with the specification of a −32 dB cross-talk (represented by curve $X_2$) for the bar output port 102', wherein the output pass-band of interest is the sub-band from about 1480 nm to about 1500 nm. Specifically, any wavelength within the sub-band from about 1540 nm to about 1560 nm in the bar output port 102' is suppressed at a power level at least 32 dB below the optical power at any wavelength in the sub-band from about 1480 nm to about 1500 nm.

Figure 9:
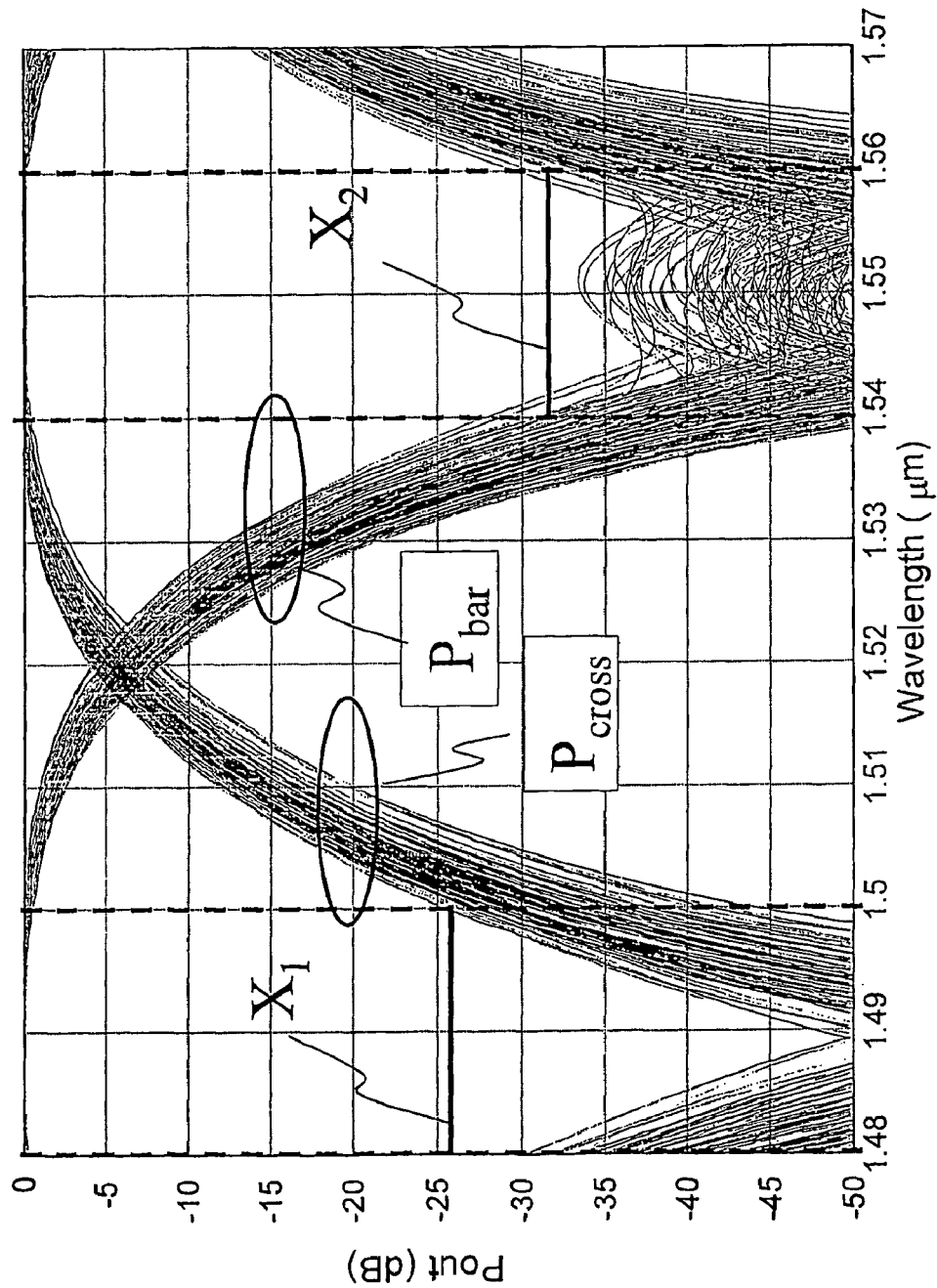
FIG. 9 shows simulation results of spectral responses of a set of devices according to the first embodiment of the present invention.

Estimated maximum insertion loss over the whole operating band is less than 1 dB. FIG. 9 shows the results of a simulation test aimed to assess the tolerance of device 300 to manufacturing errors. In particular, FIG. 9 shows a simulation result of the normalized spectral responses of a set of one hundred optical devices 200 of the type shown in FIG. 7, wherein all the three optical devices 100, 100' and 100" are in accordance to the first embodiment of FIG. 3 above described and their structural parameters are varied, simultaneously for all the three optical devices 100, 100' and 100", around the values exemplarily given above and corresponding to table 2. The structural parameters taken in consideration for statistical variation are the waveguide separation of the couplers (quote s in FIG. 5), the waveguide cross-section width in correspondence to the coupling section of the couplers (quote W in FIG. 4), the length of the straight coupling section of the couplers (quote $L_X$, X=A, B, C) and the length of the extra-length of the differential delay devices 311, 312, 313 and 314.

Table 3 in the second column shows the values of the relative standard deviations for the structural parameters used in the simulation. These are found to be a good reproduction of the statistical variations of the structural parameters in the manufacturing process. Table 3 in the third and fourth column shows the calculated corresponding relative standard deviations for the coupling angles θ and the differential delays φ of the splitters and differential delay devices, respectively. The error statistics for both the structural parameters and the corresponding coupling angles θ and differential delays φ are assumed random gaussian.

TABLE 3

|  | Relative st. dev. [%]. | Relative st. dev. for θ [%] | Relative st. dev. for φ [%] |
|---|---|---|---|
| Coupler waveguide separation | 0.8% | 1.1% | 0.0% |
| Waveguide width | 0.8% | 0.7% | 0.0% |
| Lengths | 0.1% | 0.1% | 0.1% |
| Total |  | 1.9% | 0.1% |

From table 3, the overall standard deviation for the coupling angles θ is about 2% and the standard deviation for the differential delays φ is about 0.1%.

FIG. 9 shows the simulation results of a set of one hundred devices 200 whose coupling angles θ and differential delays φ are varied according to gaussian distributions centered at the values of table 2 and with standard deviations of table 3. In particular, FIG. 9 shows that at the cross output port 103" the −26 db specification for the cross-talk of the sub-band 1480-1500 is satisfied for 98 devices out of 100 simulated devices. Also, FIG. 9 shows that at the bar output port 102' the −32 db specification for the cross-talk of the sub-band 1540-1560 is satisfied for 95 devices out of 100 simulated devices. FIG. 9 thus shows how device 200 is tolerant to manufacturing errors as large as about the triple of the assumed standard deviations. Maximum in-band ripple is less than about 0.5 dB at both the output ports for all the simulated devices.

Figure 10:
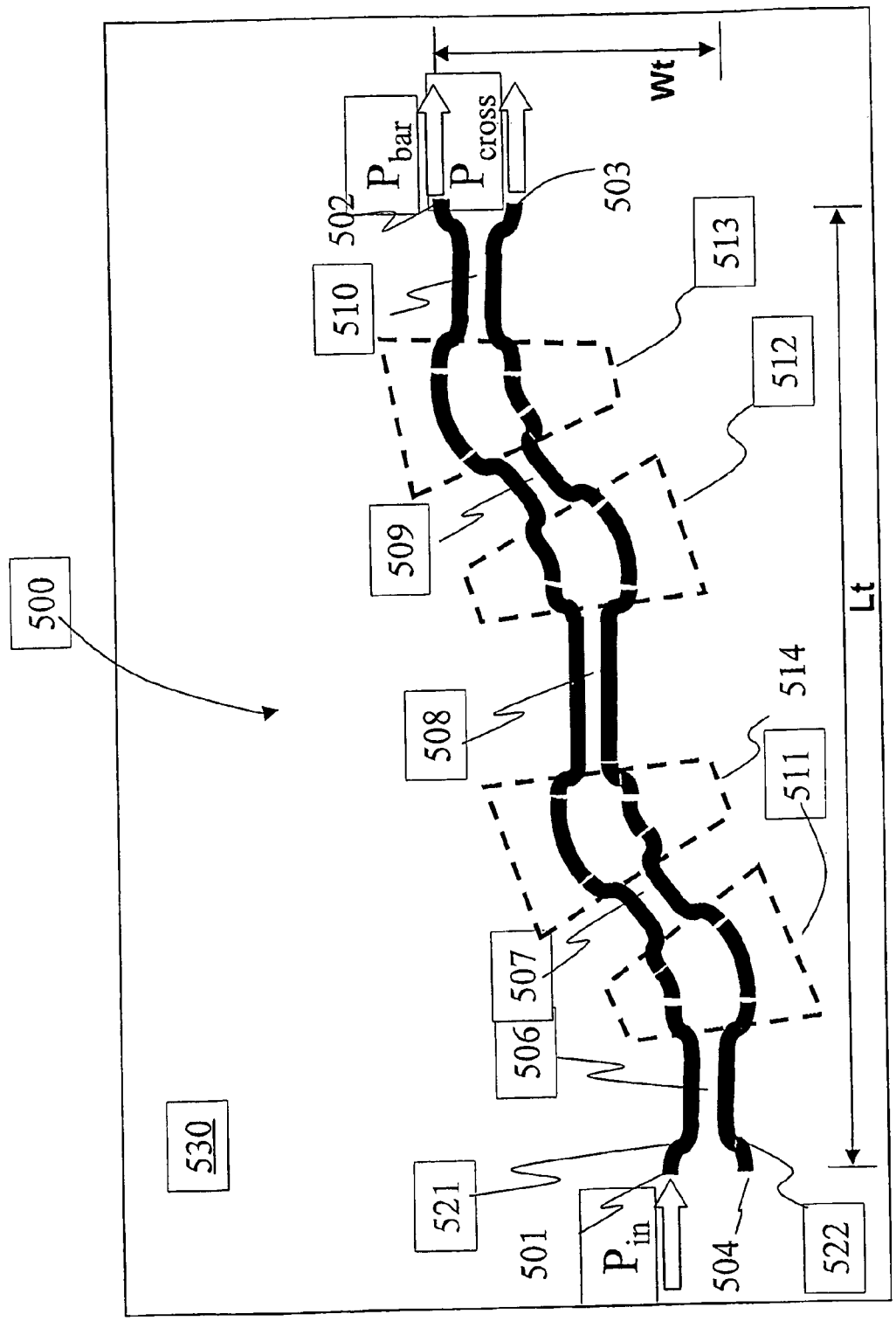
FIG. 10 shows a schematic diagram of a second exemplary embodiment of the present invention.

FIG. 10 is a schematic planar view of a PLC optical device 500 in accordance with a second embodiment of the optical device 100 of the present invention. The optical device 500 is a 2-port optical band splitter/combiner for splitting/combining a first and a second optical band comprising exemplarily the wavelengths of 1550 nm and 1490 nm, respectively. As above, the first and second optical band are exemplarily set equal to about 1550±25 nm and about 1490±25 nm, respectively. Exemplarily, respective sub-bands of first and second optical band are set equal to 1550±10 nm and 1490±10 nm, respectively. A specific level of cross-talk may be predefined for such sub-bands.

Device 500 may have an overall length Lt of about 7000 μm and an overall width Wt of about 380 μm. The two optical waveguides 521, 522 may be structurally similar to the optical waveguides 321, 322 of the first embodiment of FIG. 3. Table 4, analogous to table 2, reports a possible set of values for the most relevant design parameters of the second embodiment 500 of FIG. 10:

TABLE 4

(t, m, k) = (1, 1, 0)
β = 24.59°, $r_1$ = 1500 μm, $r_2$ = 1532.1 μm, ΔL = 13.78 m
$\phi_A > 0, \phi_B < 0, \phi_C > 0, \phi_D < 0$,
$|\phi_X(\lambda_{1op})| \approx 26\pi, \lambda_{1op}$ = 1545.7 nm
$|\phi_X(\lambda_{2op})| \approx 27\pi, \lambda_{2op}$ = 1490.5 nm
X = A, B, C, D
$L_A$ = 210.2 μm, $L_B$ = 51.2 μm, $L_C \approx 2 \times L_A$ = 420.6 μm
$2\theta_A(\lambda_{3op}) + \theta_C(\lambda_{3op}) + 2\theta_B(\lambda_{3op}) = \pi, \lambda_{3op}$ = 1542.6 nm
$2\theta_A(\lambda_{4op}) + \theta_C(\lambda_{4op}) - 2\theta_B(\lambda_{4op}) = \pi/2, \lambda_{4op}$ = 1490.5 nm All the design parameter's values of the embodiment 500 of FIG. 10 not included in table 4 are exemplarily chosen equal to the values of the corresponding design parameters of the above described first embodiment of FIG. 3.

Figure 11:
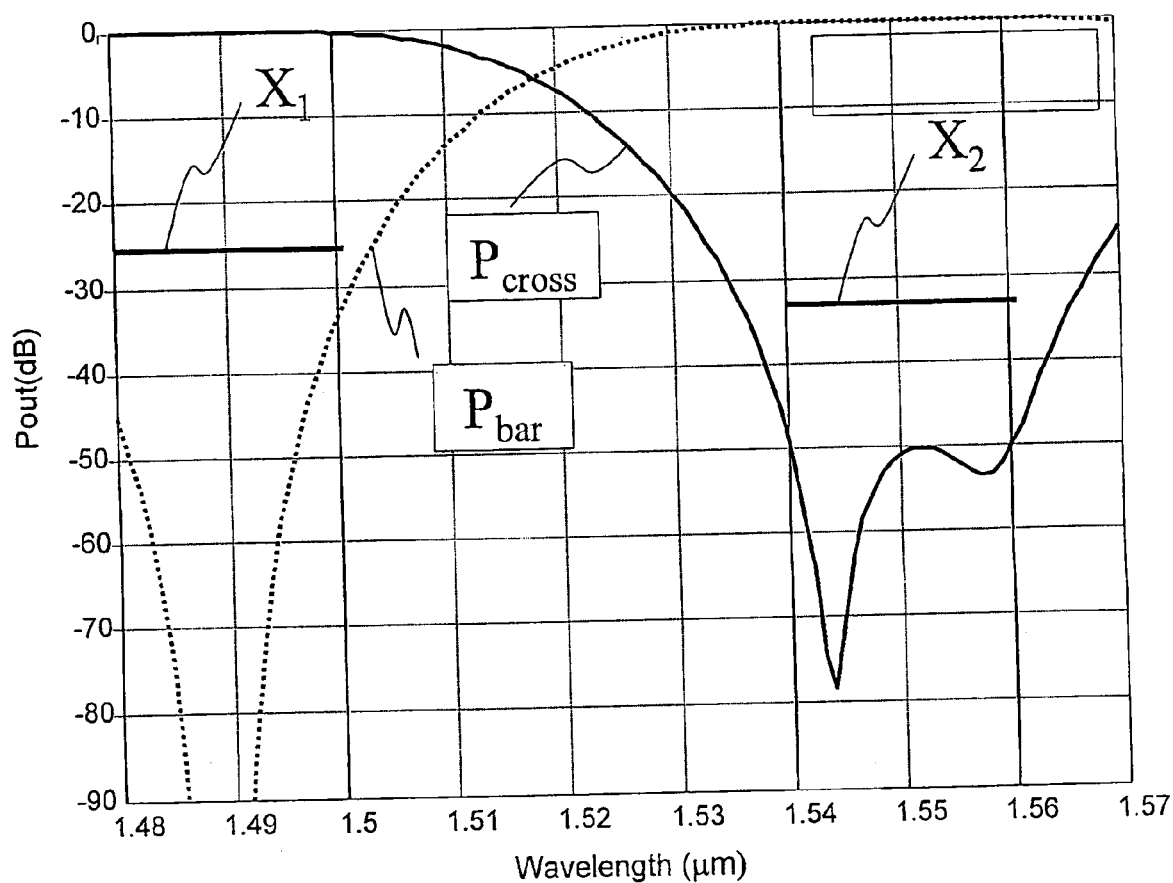
FIG. 11 shows simulation results of a spectral response of the second embodiment of the present invention.

FIG. 11 shows a simulation result of the normalized spectral response of the exemplary optical device of FIG. 7, wherein all the three optical devices 100, 100' and 100" are in accordance to the illustrative second embodiment of FIG. 10 and table 4, as above described. In FIG. 11, the curve denoted $P_{bar}$ represents the normalized spectral power outputting from the bar output port 102', and the curve denoted $P_{cross}$ represents the normalized spectral power outputting from the cross output port 103", when a large spectrum optical radiation $P_{in}$ is launched into input port 101 of FIG. 7. FIG. 11 shows that the present embodiment of the optical device 200 of FIG. 7 complies with the specification of a −26 dB crosstalk (represented by curve $X_1$) for the bar output port 102', wherein the output pass-band of interest is the sub-band from about 1540 nm to about 1560 nm. Specifically, any wavelength within the sub-band from about 1480 nm to about 1500 nm in the bar output port 102' is suppressed at a power level at least 26 dB below the optical power of any wavelength in the sub-band from about 1540 nm to about 1560 nm. Also, FIG. 11 shows that the optical device 200 of FIG. 7 complies with the specification of a −32 dB cross-talk (represented by curve $X_2$) for the cross output port 103", wherein the output passband of interest is the sub band from about 1480 nm to about 1500 nm. Specifically, any wavelength within the sub-band from about 1540 nm to about 1560 nm in the cross output port 103" is suppressed at a power level of at least 32 dB below the optical power of any wavelength in the sub-band from about 1480 nm to about 1500 nm.

Figure 12:
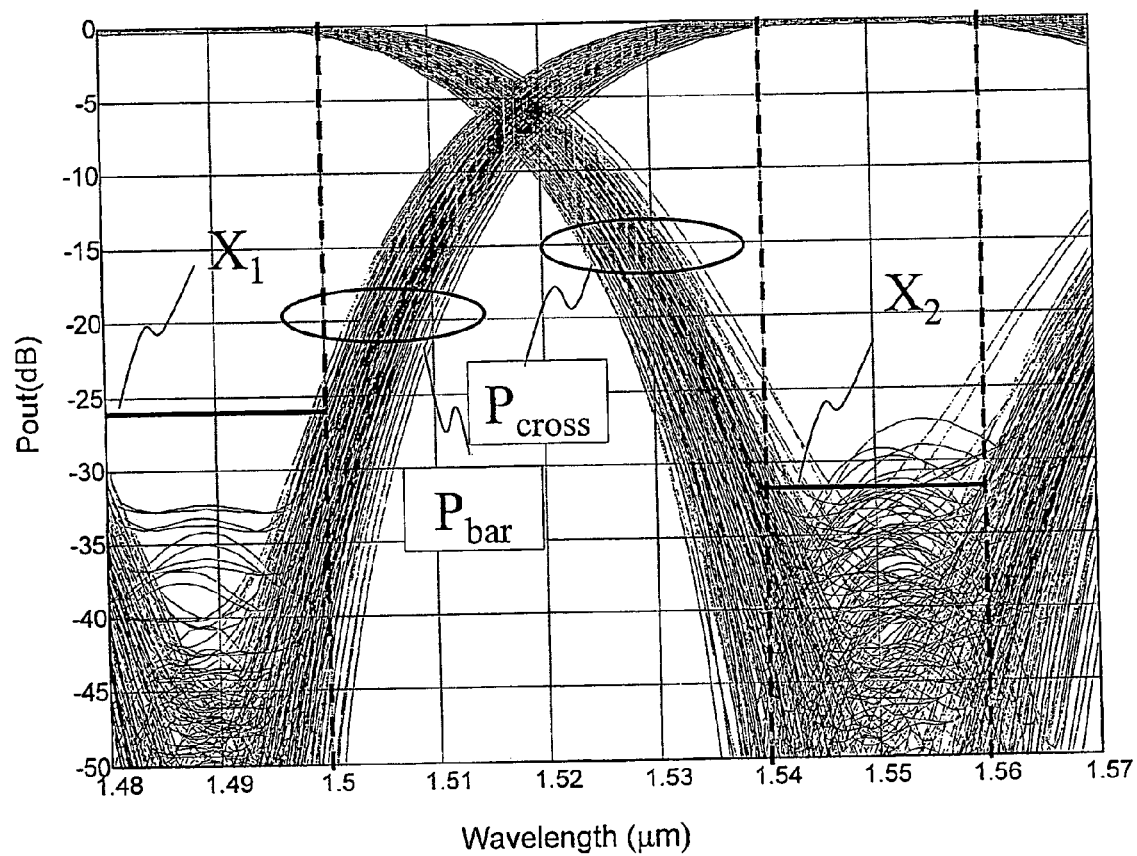
FIG. 12 shows simulation results of spectral responses of a set of devices according to the second embodiment of the present invention.

Estimated maximum insertion loss over the whole operating band is less than 1 dB. FIG. 12 shows the results of a simulation test aimed to assess tolerance of device 500 to manufacturing errors. In particular, FIG. 12 shows a simulation result of the normalized spectral responses of a set of one hundred optical devices 200 of the type shown in FIG. 7, wherein all the three optical devices 100, 100' and 100" are in accordance to the above described illustrative second embodiment 500 of FIG. 10 and their structural parameters are varied, simultaneously for all the three optical devices 100, 100' and 100", around the values exemplarily given above and corresponding to table 4. The structural parameters and the standard deviations taken in consideration for statistical variation are the same considered for the first embodiment described above (see table 3).

FIG. 12 shows that at the bar output port 102' the −26 db specification for the cross-talk of the sub-band 1480-1500 is satisfied for 95 devices out of 100 simulated devices. Also, FIG. 12 shows that at the cross output port 103" the −32 db specification for the cross-talk of the sub-band 1540-1560 is satisfied for 90 devices out of 100 simulated devices. FIG. 12 thus shows how device 500 is tolerant to manufacturing errors as large as about the triple of the assumed standard deviations. Maximum in-band ripple is less than about 0.6 dB at both the output ports for all the simulated devices.

Figure 13:
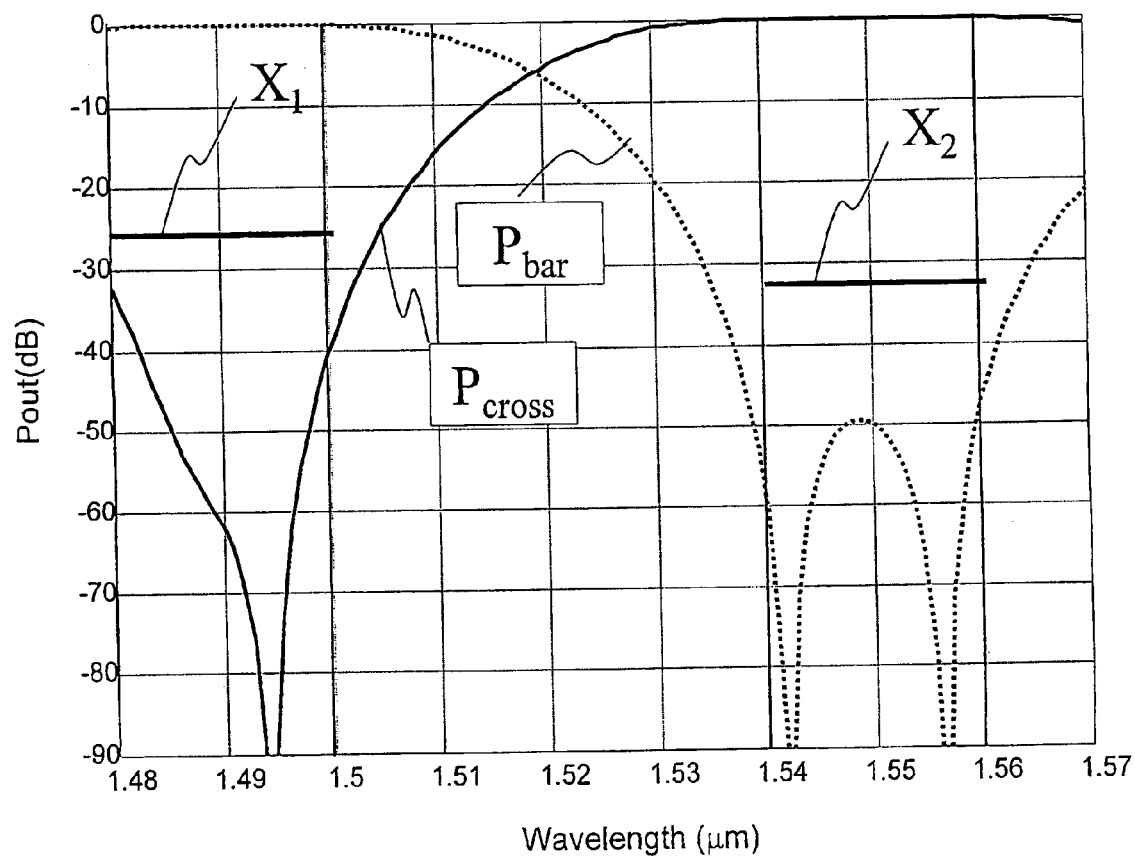
FIG. 13 shows simulation results of the spectral response of a third embodiment of the present invention.

FIG. 13 shows a simulation result of the normalized spectral response of the exemplary optical device of FIG. 7, wherein all the three optical devices 100, 100' and 100" are in accordance to a third embodiment having a structure similar to the one depicted in FIG. 10 and with the most relevant structural parameters' values exemplarily given in the following table 5:

TABLE 5

(t, m, k) = (0, 2, −1)
β = 20.89°, $r_1$ = 1500 μm, $r_2$ = 1532.1 μm, ΔL = 11.71 m
$\phi_A > 0, \phi_B < 0, \phi_C > 0, \phi_D < 0$,
$|\phi_X(\lambda_{1op})| \approx 22\pi, \lambda_{1op}$ = 1559 nm TABLE 5-continued $|\phi_X(\lambda_{2op})| \approx 23\pi$, $\lambda_{2op} = 1494$ nm
X = A, B, C, D
$L_A = 157.16$ μm, $L_B = 1196.89$ μm, $L_C = 2 \times L_A = 314.32$ μm
$2\theta_A(\lambda_{3op}) + \theta_C(\lambda_{3op}) + 2\theta_B(\lambda_{3op}) = 5\pi/2$, $\lambda_{3op} = 1556.8$ nm
$2\theta_A(\lambda_{4op}) + \theta_C(\lambda_{4op}) - 2\theta_B(\lambda_{4op}) = -\pi$, $\lambda_{4op} = 1494$ nm Also in this case, all the parameters' values of the third embodiment not included in table 5 are exemplarily chosen equal to the values of the corresponding parameters of the above described first embodiment of FIG. 3.

In FIG. 13, the curve denoted $P_{bar}$ represents the normalized spectral power outputting from bar output port 102', and the curve denoted $P_{cross}$ represents the normalized spectral power outputting from cross output port 103", when a large spectrum optical radiation $P_{in}$ is launched into input port 101 of FIG. 7. FIG. 13 shows that the present embodiment of the optical device 200 of FIG. 7 complies with the specification of a −26 dB cross-talk (represented by curve $X_1$) for the cross output port 103", wherein the output pass-band of interest is the sub-band from about 1540 nm to about 1560 nm. Also, FIG. 13 shows that the present embodiment of the optical device 200 of FIG. 7 complies with the specification of a −32 dB cross-talk (represented by curve $X_2$) for the bar output port 102', wherein the output pass-band of interest is the sub-band from about 1480 nm to about 1500 nm. Estimated maximum insertion loss over the whole operating band is less than 1 dB.

Figure 14:
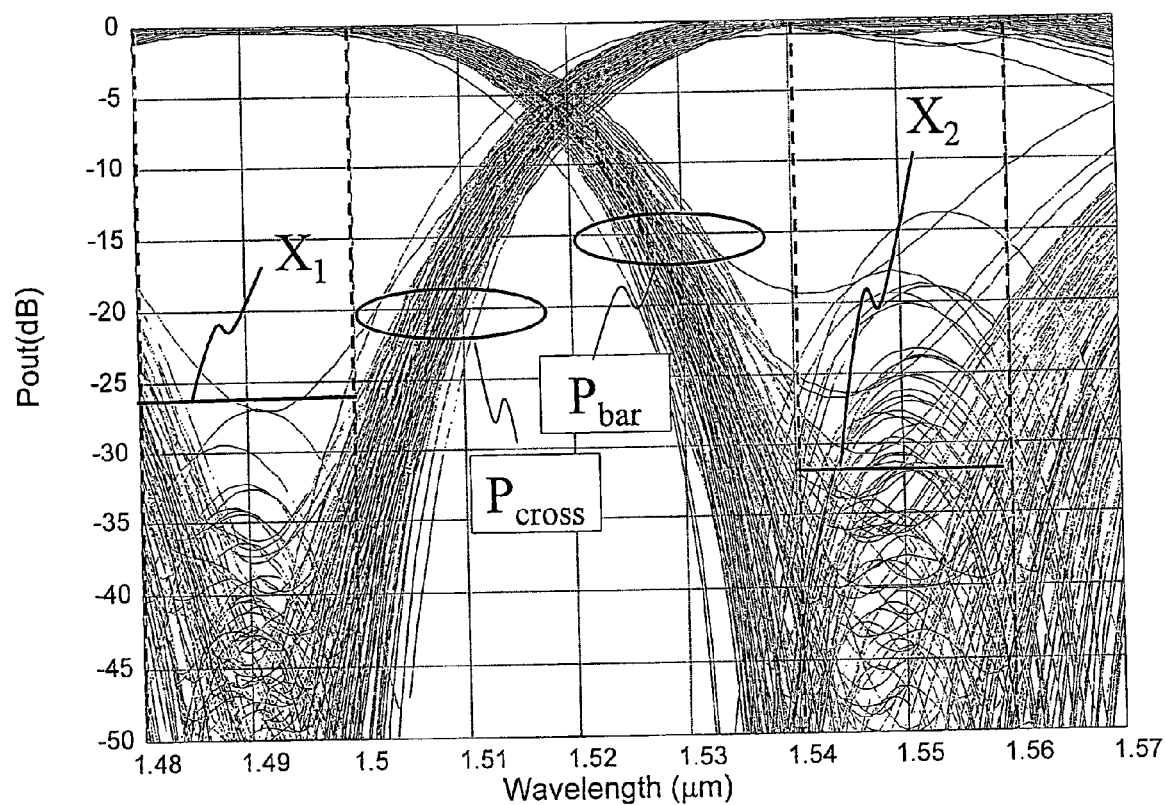
FIG. 14 shows simulation results of spectral responses of a set of devices according to the third embodiment of the present invention.

FIG. 14 shows a simulation result of the normalized spectral responses of a set of one hundred optical devices 200 of the type shown in FIG. 7, wherein all the three optical devices 100, 100' and 100" are in accordance with the present illustrative third embodiment and their structural parameters are varied, simultaneously for all the three optical devices 100, 100' and 100", around the illustrative values given in table 5. The structural parameters and the standard deviations taken in consideration for statistical variation are the same considered for the first embodiment described above (see also table 3).

FIG. 14 shows that at the cross output port 103" the −26 db specification for the cross-talk of the sub-band 1480-1500 is satisfied for 79 devices out of 100 simulated devices. Also, FIG. 14 shows that at the bar output port 102' the −32 db specification for the cross-talk of the sub-band 1540-1560 is satisfied for 77 devices out of 100 simulated devices. Maximum in-band ripple is less than about 0.5 dB at both the output ports for all the simulated devices.

A comparison between FIG. 14, FIG. 12 and FIG. 9 shows a progressive improvement of tolerance to fabrication errors with the decreasing of the overall sum of the coupling angles (last column of table 1). Decreasing this sum corresponds to choosing the indexes (t, m, k) so that the corresponding row has a higher rank in table 1. In particular, the Applicant has determined that it is preferred the configuration having (t,m,k)=(0,0,0) with respect to the configuration having (t,m,k)=(0,2,−1) and that for this preferred configuration it is further preferred having the first and second differential delay device with the differential delays having the same sign.

The fabrication of the exemplary optical devices of FIGS. 3 and 10 may be done through known processes. Exemplarily, after the deposition of a core layer on a buffer layer of silica on silicon, a resist layer may be spinned on the core layer and subsequently exposed to UV light through a mask. After that, the zones, which have been exposed, may be selectively etched. After that, the patterned layer is advantageously covered, for example with BPSG (Boron Phosphor Standard Glass).

Figure 15:
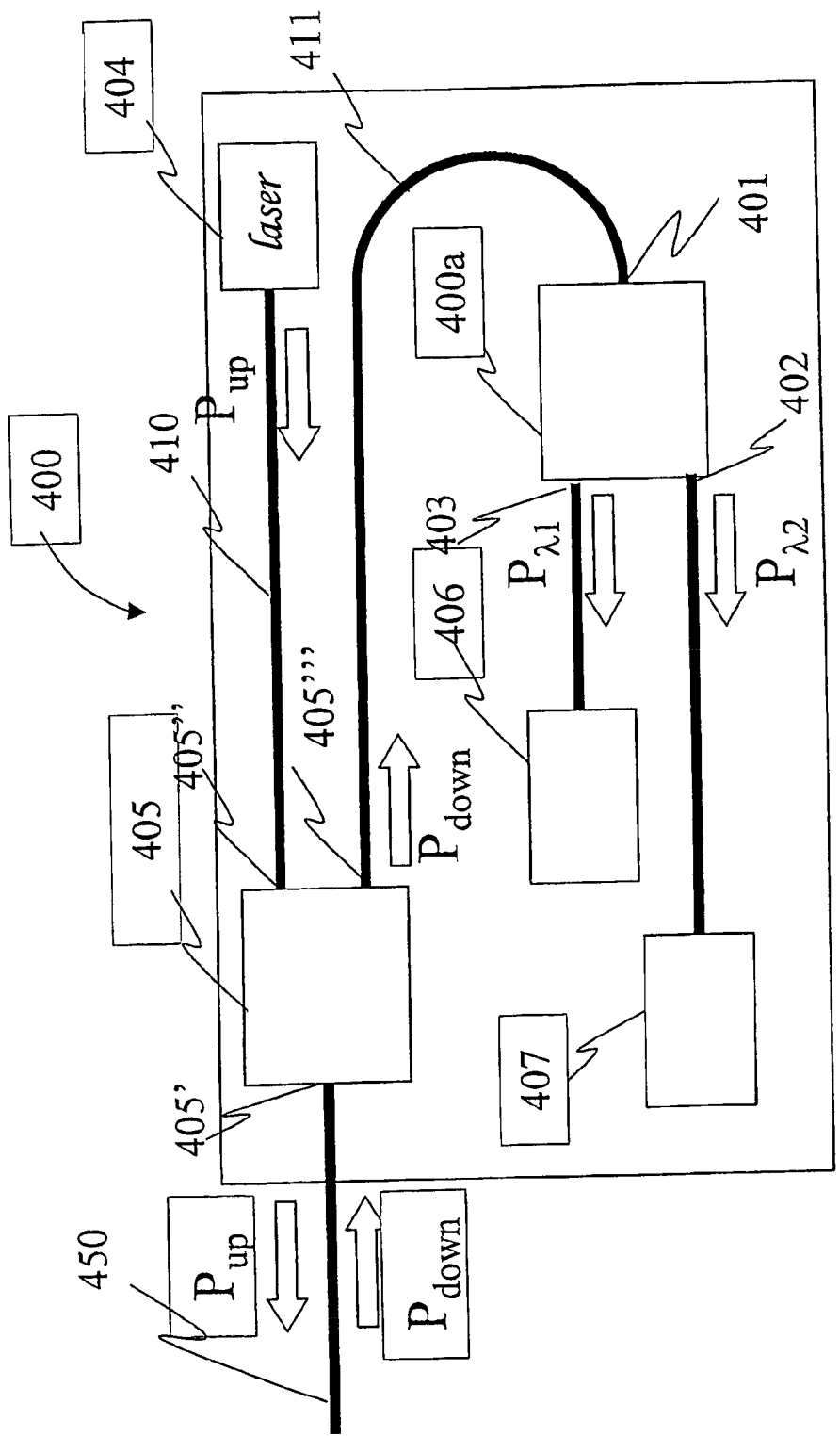
FIG. 15 shows a schematic diagram of an optical device for FTTP networks comprising the present invention's optical device.

The present invention finds particularly useful application in the field of FTTP networks. FIG. 15 shows an exemplary optical device 400 for use in FTTP networks, which makes use of the present invention. The optical device 400 may be an optical network unit (ONU), i.e. a terminal apparatus of the FTTP network, particularly of the triple play networks, on the customer side. Such a kind of apparatus is also known as "triplexer".

The optical device 400 comprises an optical band splitter 400a in accordance to the present invention (e.g. as device 100, 200, 300 or 500) for splitting/combining a first and a second optical band. Optical band splitter/combiner 400a comprises a first port 401, a second port 402 and a third port 403. Exemplarily, the first port 401 may correspond to the first input port (e.g. 101 of devices 100 and 200 or 301 of device 300), the second port 402 may correspond to the bar output port (e.g. 102 of device 100, 102' of device 200 or 302 of device 300) and the third port 403 may correspond to the cross output port (e.g. 103 of device 100, 103" of device 200 or 303 of device 300). Other configurations of the ports are possible, for example the second port 402 may correspond to the cross output port. Optical device 400 also comprises a first optical receiver 406 apt to receive a first optical wavelength $\lambda_1$ within the first optical band (e.g. near 1490 nm), and optically connected to the third port 403 and a second optical receiver 407 apt to receive a second optical wavelength $\lambda_2$ (e.g. near 1550 nm) within the second optical band and optically connected to the second port 402. The optical device 400 may also comprise an additional optical band splitter/combiner 405 for splitting/combining a third optical band from the first and the second optical band, the device 405 being connected to the optical band splitter/combiner 400a for example through an optical waveguide 411. Optical band splitter 405 may or may not be in accordance to the present invention. For example, optical band splitter 405 may be made according to the teaching of copending patent application WO/EP2004/004583, whose specification is herein incorporated by reference. Optical device 400 may also comprise an optical transmitter 404, apt to emit an optical radiation having a third wavelength $\lambda_3$ within the third optical band (e.g. near 1310 nm), and optically connected to the optical band splitter/combiner 405, for example through optical waveguide 410. Optical band splitter/combiner 405 comprises a first port 405', a second port 405" and a third port 405'". Optical device 400 is apt to be connected to an optical transmission line 450 such as for example a fiber optic transmission line.

In use, an optical signal $P_{up}$ having the third wavelength $\lambda_3$ emitted by the optical transmitter 404 is directed, for example through waveguide 410, into the second port 405" of device 405. It is then mostly directed to the first optical port 405' of device 405 in order to be fed into the optical transmission line 450 in an up-stream direction. An optical signal $P_{down}$ comprising the first wavelength $\lambda_1$ and the second wavelength $\lambda_2$, propagating through the optical transmission line 450 in a down-stream direction is fed to the optical port 405' of device 405. It is then mostly directed to the third optical port 405'". Optical signal $P_{down}$ is then directed, for example through waveguide 411, into the first port 401 of the optical band splitter 400a which splits the radiation into two-optical signals: $P\lambda_1$ having an optical power mostly at the first wavelength $\lambda_1$ and outputting from the third optical port 403 and $P\lambda_2$ having an optical power mostly at the second wavelength $\lambda_2$ and outputting from the second optical port 402. Each of the two optical radiations are subsequently received by the respective optical receiver 406 and 407.

In a more preferred configuration, optical unit 400 is based on PLC technology in all or part of its components. Preferably, optical element 400a is a PLC device. In a more preferred configuration, optical element 400a is a high index contrast PLC device, for example having index contrast greater than about 1%, preferably greater than, or equal to, about 2%. Advantageously, the refractive index contrast is lower than, or equal to, about 4.5%, preferably lower than, or equal to, about 3%.

The optical devices (100; 200; 400) in accordance with the present invention find particularly useful applications in optical networks apt to distribute telecommunication services to a plurality of customers. For example, optical networks may be triple play networks or passive optical networks or fiber-to-the-premises networks or, more generally, access networks. The services are delivered using at least a first and a second signal having respectively a first and a second wavelength within respectively a first and a second optical band. Exemplarily, the optical network comprises a central station, a plurality of terminal stations, and a plurality of optical links connecting each terminal station to the central station. Each optical link may comprise cabled fibers and may include passive or active optical devices apt to branch, add, route, amplify, attenuate or switch the optical signals propagating through the link. The terminal station may be of the kind described in FIG. 15, wherein $P_{down}$ comprises the first and second signal.

The invention claimed is:

1. An optical device for splitting/combining a first and a second continuous optical wavelength bands, each wider than 10 nm, comprising:
   a first input port and a first and a second output ports;
   a first, a second, a third, a fourth and a fifth optical splitting devices optically coupled in cascade and optically connected to the first input port and to the first and second output ports, wherein:
      the first and the fifth optical splitting devices have an associated first coupling angle $\theta_A$;
      the second and the fourth optical splitting devices have an associated second coupling angle $\theta_B$; and
      the third optical splitting device has an associated third coupling angle $\theta_C$; and
   a first, a second, a third and a fourth optical differential delay devices optically coupled to, and interleaved between, said optical splitting devices, wherein:
      the first, second, third and fourth optical differential delay devices have a respective differential delay, which is substantially an even multiple of $\pi$ at least at a first wavelength ($\lambda_{1op}$) within the first optical band and substantially an odd multiple of $\pi$ at least at a second wavelength ($\lambda_{2op}$) within the second optical band;
      the differential delay of the third optical differential delay device is opposite in sign with respect to the differential delay of the second optical differential delay; and
      the differential delay of the fourth optical differential delay device is opposite in sign with respect to the differential delay of the first optical differential delay,
   wherein:
      the coupling angles $\theta_A$, $\theta_B$ and $\theta_C$ being selected in order to direct more than half of an output power of a first optical radiation inputting at the first input port and having any wavelength within the first optical band to the first output port and more than half of an output power of a second optical radiation inputting at the first input port and having any wavelength within the second optical band to the second output port; and
      the coupling angles $\theta_A$, $\theta_B$ and $\theta_C$ satisfy, at least at a wavelength $\lambda_{3op}$ within the first optical band, the following relation:

$$2\theta_A(\lambda_{3op}) + \theta_C(\lambda_{3op}) + 2\theta_B(\lambda_{3op}) \leq 2\pi.$$

2. The optical device of claim 1, wherein the coupling angles $\theta_A$, $\theta_B$ and $\theta_C$ satisfy, at least at a wavelength $\lambda_{3op}$ within the first optical band, the following relation:

$$2\theta_A(\lambda_{3op}) + \theta_C(\lambda_{3op}) + 2\theta_B(\lambda_{3op}) \leq \frac{3}{2}\pi.$$

3. The optical device of claim 2, wherein the coupling angles $\theta_A$, $\theta_B$ and $\theta_C$ satisfy, at least at a wavelength $\lambda_{3op}$ within the first optical band, the following relation:

$$2\theta_A(\lambda_{3op}) + \theta_C(\lambda_{3op}) + 2\theta_B(\lambda_{3op}) \leq \pi.$$

4. The optical device of claim 3, wherein the coupling angles $\theta_A$, $\theta_B$ and $\theta_C$ satisfy, at least at a wavelength $\lambda_{3op}$ within the first optical band, the following relation:

$$2\theta_A(\lambda_{3op}) + \theta_C(\lambda_{3op}) + 2\theta_B(\lambda_{3op}) = \frac{\pi}{2}.$$

5. The optical device of claim 1, wherein the first optical differential delay device and the second optical differential delay device have differential delays equal in sign.

6. The optical device of claim 1, comprising a planar optical device.

7. The optical device of claim 6, comprising a pair of optical waveguides forming the first, second, third, fourth and fifth optical splitting devices and the first, second, third and fourth optical differential delay devices.

8. The optical device of claim 7, wherein the optical waveguides have an index contrast higher than about 1%.

9. The optical device of claim 7, wherein the optical waveguides have an index contrast lower than about 4.5%.

10. An optical device for splitting/combining a first and a second optical wavelength band comprising a plurality of optical devices according to claim 1, optically connected in tree-cascade.

11. An optical network unit, comprising:
   an optical device for splitting/combining a first and a second optical wavelength band according to claim 1,
   a first optical receiver optically connected to the optical device capable of being adapted and to receive a first signal within one of the first and second optical bands; and
   a second optical receiver optically connected to the optical device capable of being adapted and to receive a second signal within the other of said first and second optical bands.

12. The optical network unit of claim 11, wherein the optical device for splitting/combining a first and a second optical wavelength band comprises an input port capable of being optically connected to an optical transmission line capable of being adapted to propagate said first and second signals.

13. An optical network suitable to operate at least at a first and at a second optical transmission wavelengths, respectively, within a first and a second optical wavelength band, the network comprising at least an optical device according to claim 1 for splitting/combining said first and second optical wavelength bands.

* * * * *